United States Patent
Bellorado et al.

(10) Patent No.: US 10,164,760 B1
(45) Date of Patent: Dec. 25, 2018

(54) TIMING EXCURSION RECOVERY

(71) Applicant: Seagate Technology LLC, Cupertino, CA (US)

(72) Inventors: Jason Vincent Bellorado, San Jose, CA (US); Marcus Marrow, San Jose, CA (US); Zheng Wu, San Jose, CA (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 15/297,089

(22) Filed: Oct. 18, 2016

(51) Int. Cl.
*H04L 7/00* (2006.01)

(52) U.S. Cl.
CPC .................. *H04L 7/0016* (2013.01)

(58) Field of Classification Search
CPC ......... G06F 11/08; G11B 20/10; G11B 20/18; G11B 20/1833; H03L 7/00; H04B 10/61; H04L 1/00; H04L 1/20; H04L 7/00; H04L 7/0016; H04L 27/00; H04L 27/0014; H04L 27/38
USPC .................. 331/16; 375/316, 351, 371, 376; 714/762
See application file for complete search history.

(56) References Cited

U.S. PATENT DOCUMENTS

| | | | |
|---|---|---|---|
| 5,563,746 A | 10/1996 | Bliss | |
| 5,726,818 A | 3/1998 | Reed et al. | |
| 5,754,352 A | 5/1998 | Behrens et al. | |
| 5,793,548 A | 8/1998 | Zook | |
| 5,822,142 A | 10/1998 | Hicken | |
| 5,909,332 A | 6/1999 | Spurbeck et al. | |
| 5,954,837 A | 9/1999 | Kim | |
| 6,069,758 A | 5/2000 | Chung | |
| 6,172,836 B1 | 1/2001 | Bang | |
| 6,275,346 B1 | 8/2001 | Kim et al. | |
| 6,307,696 B1 | 10/2001 | Bishop et al. | |
| 6,330,293 B1 | 12/2001 | Klank et al. | |
| 6,353,649 B1 | 3/2002 | Bockleman et al. | |
| 6,480,349 B1 | 11/2002 | Kim et al. | |
| 6,594,094 B2 | 7/2003 | Rae | |
| 6,594,098 B1 | 7/2003 | Sutardja | |
| 6,760,185 B1 | 7/2004 | Roth et al. | |
| 6,973,150 B1 | 12/2005 | Thuringer | |
| 6,996,193 B2 | 2/2006 | Yamagata et al. | |
| 7,035,029 B2 | 4/2006 | Sawada et al. | |
| 7,068,461 B1 | 6/2006 | Chue et al. | |

(Continued)

*Primary Examiner* — Shawkat M Ali
(74) *Attorney, Agent, or Firm* — Cesari & Reed, LLP; Kirk A. Cesari; Christian Best

(57) ABSTRACT

Systems and methods are disclosed for detecting and compensating for timing excursions in a data channel. If a signal contains discontinuities in phase, a detector of the channel may lose lock on the signal, resulting in the channel incorrectly adjusting a sampling phase toward a following symbol or previous symbol. This is referred to as a cycle slip, where the integer alignment of the sampling of a signal contains a discontinuity over the duration of a sector, preventing decoding of the signal. A circuit may be configured to detect a cycle slip during processing of a signal at a data channel based on timing error values, and when the signal fails to decode, shift an expected sampling phase of a detector for a subsequent signal processing attempt. Shifting the expected sampling phase can cause the channel to adjust the sampling phase in the correct direction, thereby preventing a cycle slip.

20 Claims, 14 Drawing Sheets

(56) References Cited

U.S. PATENT DOCUMENTS

| | | |
|---|---|---|
| 7,075,967 B2 | 7/2006 | Struhsaker et al. |
| 7,199,956 B1 | 4/2007 | Moser et al. |
| 7,297,582 B2 | 11/2007 | Asakura et al. |
| 7,602,568 B1 | 10/2009 | Katchmart |
| 7,643,548 B2 | 1/2010 | Hafeez |
| 7,665,007 B2 | 2/2010 | Yang et al. |
| 7,738,538 B1 | 6/2010 | Tung |
| 7,917,563 B1 | 3/2011 | Shih et al. |
| 7,995,691 B2 | 8/2011 | Yang |
| 8,019,026 B2 | 9/2011 | Maltsev et al. |
| 8,077,571 B1 | 12/2011 | Xia et al. |
| 8,121,229 B2 | 2/2012 | Kuo et al. |
| 8,139,305 B2 | 3/2012 | Mathew et al. |
| 8,159,768 B1 | 4/2012 | Miyamura |
| 8,266,505 B2 | 9/2012 | Liu et al. |
| 8,331,050 B1 | 12/2012 | Lou |
| 8,400,726 B1 | 3/2013 | Zheng |
| 8,405,924 B2 | 3/2013 | Annampedu |
| 8,516,347 B1 | 8/2013 | Li et al. |
| 8,553,730 B2 | 10/2013 | Schmidl et al. |
| 8,593,750 B2 | 11/2013 | Shibano |
| 8,625,216 B2 | 1/2014 | Zhang et al. |
| 8,681,444 B2 | 3/2014 | Zhang |
| 8,706,051 B2 | 4/2014 | Park et al. |
| 8,774,318 B2 | 7/2014 | Lakkis |
| 9,043,688 B1 | 5/2015 | Chan et al. |
| 9,077,501 B1 * | 7/2015 | Oberg ............... H04L 1/0054 |
| 9,078,204 B2 | 7/2015 | Okazaki |
| 9,129,646 B2 | 9/2015 | Mathew et al. |
| 9,178,625 B1 * | 11/2015 | Hueda ............... H04B 10/616 |
| 9,236,952 B2 | 1/2016 | Sun |
| 9,362,933 B1 | 6/2016 | Chaichanavong |
| 9,425,950 B2 | 8/2016 | Kou |
| 9,537,589 B2 | 1/2017 | Kim et al. |
| 9,613,652 B2 | 4/2017 | Link et al. |
| 2002/0094048 A1 | 7/2002 | Simmons et al. |
| 2003/0026016 A1 | 2/2003 | Heydari et al. |
| 2003/0048562 A1 | 3/2003 | Heydari et al. |
| 2003/0185291 A1 | 10/2003 | Nakahira et al. |
| 2004/0047403 A1 | 3/2004 | Choi et al. |
| 2007/0002890 A1 | 1/2007 | Mangold et al. |
| 2007/0018733 A1 | 1/2007 | Wang |
| 2007/0205833 A1 * | 9/2007 | Mar ............... H03L 7/095 331/16 |
| 2008/0292029 A1 | 11/2008 | Koslov |
| 2009/0268857 A1 | 10/2009 | Chen |
| 2010/0138722 A1 | 6/2010 | Harley |
| 2010/0211830 A1 | 8/2010 | Sankaranarayanan et al. |
| 2010/0272150 A1 | 10/2010 | Kil et al. |
| 2011/0072330 A1 | 3/2011 | Kolze |
| 2011/0158359 A1 | 6/2011 | Khayrallah et al. |
| 2013/0182347 A1 | 7/2013 | Maeto |
| 2013/0339827 A1 | 12/2013 | Han et al. |
| 2014/0337676 A1 | 11/2014 | Yen et al. |
| 2014/0355147 A1 | 12/2014 | Cideciyan et al. |
| 2015/0124912 A1 | 5/2015 | Eliaz et al. |
| 2015/0179213 A1 | 6/2015 | Liao et al. |
| 2015/0189574 A1 | 7/2015 | Ng et al. |
| 2016/0055882 A1 * | 2/2016 | Cideciyan ........ G11B 20/10009 360/31 |
| 2016/0134449 A1 * | 5/2016 | Liu ............... H04L 27/0014 375/226 |
| 2016/0156493 A1 | 6/2016 | Bae et al. |
| 2016/0270058 A1 | 9/2016 | Furuskog et al. |
| 2016/0293205 A1 | 10/2016 | Jury et al. |
| 2017/0162224 A1 | 6/2017 | Mathew et al. |

\* cited by examiner

TIMING EXCURSION RECOVERY

SUMMARY

In certain embodiments, an apparatus may comprise a circuit configured to detect a cycle slip event during processing of a signal at a data channel, and shift an expected sampling phase of a detector of the data channel for a subsequent attempt to process the signal In certain embodiments, a method may comprise detecting a cycle slip event during processing of a signal at a data channel based on timing error values produced from sampling the signal at a first sampling phase, and shifting an expected sampling phase of a detector of the data channel for a subsequent attempt to process the signal.

In certain embodiments, an apparatus may comprise a data channel for a magnetic storage medium configured to detect a timing excursion in a signal based on a difference between a sampling phase at which the signal is sampled and an expected sampling phase, and, in response to the signal failing to decode, adjust the expected sampling phase based on the detected timing excursion.

DETAILED DESCRIPTION

In the following detailed description of certain embodiments, reference is made to the accompanying drawings which form a part hereof, and in which are shown by way of illustration of example embodiments. It is also to be understood that features of the embodiments and examples herein can be combined, exchanged, or removed, other embodiments may be utilized or created, and structural changes may be made without departing from the scope of the present disclosure.

In accordance with various embodiments, the methods and functions described herein may be implemented as one or more software programs running on a computer processor or controller. Dedicated hardware implementations including, but not limited to, application specific integrated circuits, programmable logic arrays, and other hardware devices can likewise be constructed to implement the methods and functions described herein. Methods and functions may be performed by modules, which may include one or more physical components of a computing device (e.g., logic, circuits, processors, etc.) configured to perform a particular task or job, or may include instructions that, when executed, can cause a processor to perform a particular task or job, or any combination thereof. Further, the methods described herein may be implemented as a computer readable storage medium or memory device including instructions that, when executed, cause a processor to perform the methods.

Figure 1:
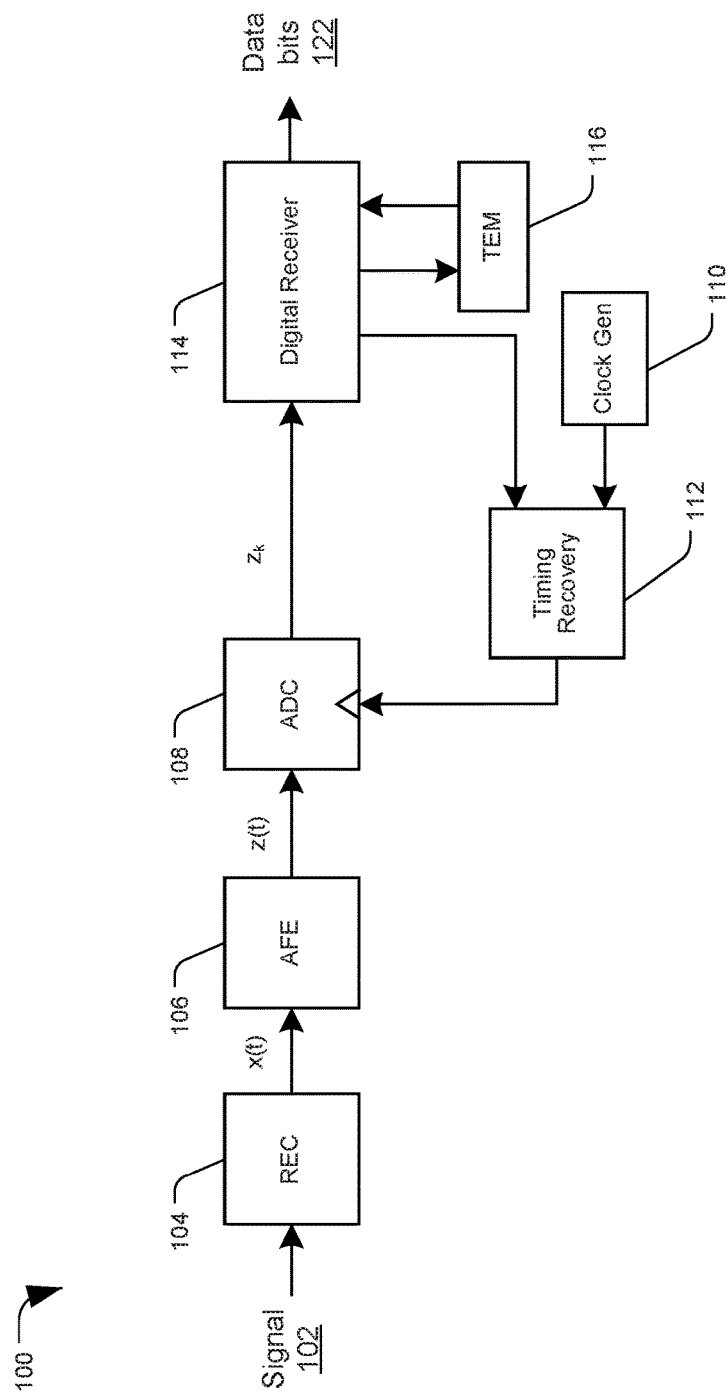
FIG. 1 is a diagram of a system configured to perform timing excursion recovery, in accordance with certain embodiments of the present disclosure.

FIG. 1 is a diagram of a system configured to perform timing excursion recovery, generally designated 100, in accordance with certain embodiments of the present disclosure. The system 100 may include components of a communications channel by which an information signal 102 is received and processed to obtain data, such as a sequence of data bits 122. The components of the channel may include circuitry, registers, and modules configured to perform operations in relation to the signal 102, and may be included on one or more chips of a device. A channel may be employed at a receiving end of wired or wireless transmissions, or in devices such as hard drives for storing data to and retrieving data from a storage medium. Some storage devices, such as hard disc drives, may include more than one channel, such as a data channel for processing data storage sectors, and a servo channel for processing servo sectors. Although examples and illustrative embodiments provided herein may be directed to implementations within a data storage device (DSD), the applicability of the techniques are not limited thereto.

System 100 may include a receiver (REC) 104 configured to receive a signal waveform 102. For example, the receiver 104 may be an antenna that receives wireless signals 102, or a read head that detects magnetic fields 102 generated by data stored to a hard drive. The receiver 104 may provide the received signal x(t) to an analog front end (AFE) 106, which may be circuitry configured to condition an analog signal via amplifiers, filters, and other operations, before providing the conditioned signal z(t) to other components for further processing. An analog to digital converter (ADC) 108 may periodically sample the conditioned analog signal at a frequency controlled by a clock signal generator 110 and timing recovery module 112 or timing loop. The clock generator 110 may generate a periodic clock signal, which may be modified by the timing recovery module 112 in order to match the sampling rate to the symbol rate of the signal 102. Symbol rate, also known as baud rate, may be the number of symbol changes, waveform changes, or signaling events across the signal 102 per unit of time (e.g. symbols per second). Each symbol can convey one or several bits of data. Sampling the signal 102 at the ADC 108 may include converting a continuous physical quantity (e.g. voltage) of the signal into discreet digital numbers or values representing the quantity's amplitude. The sampled values $z_k$ may be used to determine patterns in the signal which may be used to extract digital bits of information from the signal. The digital values from the ADC 108 may be provided to a digital receiver 114. The digital receiver may include various components, such as an equalizer, a detector, and a decoder. An equalizer may reverse or reduce distortions in the signal. A detector may determine a bit stream from the signal based on the sampled values $z_k$ from the ADC (e.g. whether the sample values indicate a 1 or a 0). The detected bit stream may be passed to a decoder, which may decode the bit stream into usable data bits 122. For example, the data in the signal 102 may be encoded with an error correction code, and the decoder may attempt to determine and correct errors in the detected bits based on the error correction code. The decoder may output the data bit sequence 122 of decoded and error-corrected bits, representing the data encoded within the signal 102.

As outlined above, in sampled data systems a continuous-time waveform (e.g. signal 102) may be applied to an analog front-end (AFE) 106 to be conditioned prior to sampling by an analog-to-digital converter (ADC) 108. In many implementations, the sampling rate of the ADC is equivalent to the baud/symbol rate of the signal 102 and, thus, a single sample is produced for each symbol to be equalized by the digital receiver 114. The digital receiver 114 may operate on the expectation that the samples $z_k$ of the continuous time waveform are taken at a desired, predetermined, sampling phase. As such, the timing recovery module 112, which acts to achieve and maintain a desired sampling phase, can be a critical aspect of sampled data systems.

A sampling phase may refer to where a signal is sampled within a sampling interval for each symbol. An expected sampling phase may correspond to an expected point at which a signal is sampled within the sampling interval for each symbol. For example, a 0% expected sampling phase may expect each sample to be taken in the middle of the sampling interval, while a +20% expected sampling phase may expect the sample to be taken 20% of the sampling interval later in time, and −20% may expect the sample to be taken 20% of the sampling interval earlier in time. As another example, a signal may be sampled at regular intervals (x, x+T, x+2T, x+3T, . . . ), where x is a value in the range [0, T]. In this context, the sampling interval may be T, or equivalently stated, the sampling frequency may be 1/T, and the sampling phase may be x. If a signal is sampled every second, it could be sampled at times (1, 2, 3, . . . ) or (1.25, 2.25, 3.25) or (1.5, 2.5, 3.5, . . . ). In each of these examples, the sampling frequency is 1 sample per second. However, the sampling phase, or where in the sampling interval the sample is taken, is different. In a sampled data system, x may be chosen up-front and cannot be changed. The sampling phase x may, thus, be the expected or desired phase at which the signal is sampled.

However, the symbol rate of the sampled signal, the sampling phase, or both may not remain perfectly consistent, and so the sampling phase at which samples are taken may deviate from the expected sampling phase. Differences between the actual sampling phase and the expected sampling phase, sometimes called a sampling or timing error, may degrade the performance of a sampled data system. As such, sampled data systems may estimate this timing error using the obtained samples and adjust the sampling phase to reorient the sampling phase back toward the expected sampling phase (e.g. by slightly delaying the next sample or taking the next sample slightly early). This operation is typically referred to as timing recovery.

System 100 may be configured to generate a sampled data sequence at a desired sampling phase, according to certain embodiments of the present disclosure. Digitized samples from digital receiver 114 may be applied to the timing recovery module 112, which computes a timing error between the sampling phase of the applied samples and the desired sampling phase. The timing recovery module 112 may then modulate the phase of the sampling clock based on the timing error to drive the residual phase error to zero.

The efficacy of the timing recovery module 112 may be dependent on the ability of the digital receiver 114 to accurately extract bit values from the samples $z_k$. However, if a significant deviation in the sampling phase from the expected sampling phase arises (e.g. due to an irregularity in the signal), referred to as a timing excursion, the digital receiver 114 may make incorrect decisions on which symbol or bit value a given sample corresponds to. Timing excursions may be caused by any number of things. One example could be low reliability decisions by the timing recovery module 112 which cause the timing loop to drift away from the desired sampling phase. A "mode hop" may be a cause of timing excursion specific to magnetic recording and, specifically, HAMR (heat-assisted magnetic recording). When the signal is being written to the disc, a mode hop may refer to an instantaneous jump in phase of the signal written to the disc. During readback of the signal, the phase could be as expected until this written-in phase jump is encountered. The mode hope may cause the phase to instantaneously jump away from the expected sampling phase by an amount equal to the magnitude of the written phase discontinuity. In this manner a mode hop can induce a timing excursion on the readback of the sector including the mode hop.

Timing excursions can cause significant problems in recovering valid data from the signal 102. Accordingly, a timing excursion module 116 may be used to detect timing excursions and to shift a sampling phase of the detector based on the timing excursions. Signal sampling and timing excursions are discussed in greater detail in regards to FIGS. 2 through 4.

Figure 2:
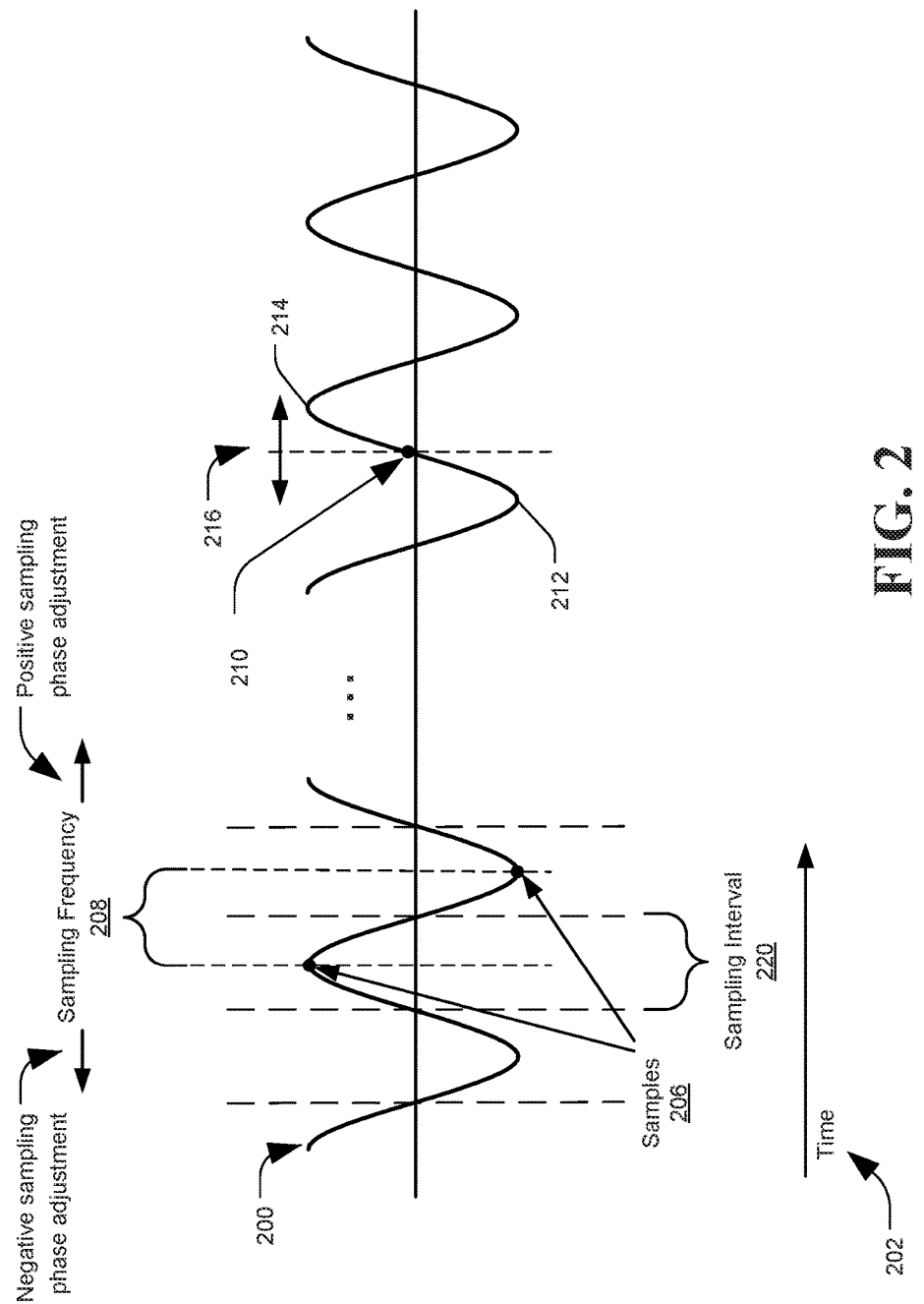
FIG. 2 is a diagram of a sampled signal for performing timing excursion recovery, in accordance with certain embodiments of the present disclosure.

Turning now to FIG. 2, a diagram of a signal pattern 200 is depicted, in accordance with certain embodiments of the present disclosure. A procedure for sampling the signal 200 to obtain sample values is described. Although a simple sine-wave signal pattern 200 is illustrated, the process may also apply to more complex signals. Signal pattern 200 may be received at an ADC in the form of a continuous voltage quantity received over a time period 202. The ADC may sample the signal 200 one time (or more, depending on the implementation) per sampling interval 220 to obtain sample values 206 representing the state of the signal 200 at the point in time when the signal 200 was sampled. The sampling frequency 208 at which the ADC samples the signal 200 may be controlled by a clock or timing signal provided to the ADC. The dashed lines 208 may represent a clock signal triggering a sampling by the ADC, with the black dots representing the sample points 206 and values.

Where the signal 200 is sampled within each sampling interval 220 may be referred to as the sampling phase. In the example embodiment of FIG. 2, sampling the signal 200 in the middle of the sampling interval 220 may perform peak sampling, where a sample is taken at a high or low point for a particular symbol of the signal 200 waveform. However, the sampling phase may be shifted to the left or right within the sampling interval 220, by some percentage of the total sampling interval 220. The sampling frequency 208 may remain the same, while shifting the sampling phase in a negative (e.g. left) or positive (e.g. right) direction.

Irregularities in the received signal (e.g. due to eccentricity of a data track on a disk storage medium, where the track is not perfectly centered around the disk center) or other influences may result in the signal frequency being slightly inconsistent over time 202. Accordingly, the sampling phase at which the samples 206 are taken may be slightly off from the expected position, e.g. the peak, of the signal.

Slight irregularities can be corrected based on sampling error estimates. Obtaining sampling error estimates is further described below in regard to FIG. 7. For example, if the samples values indicate the samples were taken slightly to the left (or negative direction) of the expected sampling phase, the phase lock loop system may adjust the sampling phase in the positive direction for the next sample, so that the sample is taken closer to the expected sampling phase.

A more significant deviation in the sampling phase from the expected phase (e.g. a timing excursion or mode hop creating a significant phase offset from the expected phase) may result in a sample being taken at a point 210 which may make it difficult for a detector to determine whether the sample corresponds to a preceding symbol 212, or to a following symbol 214. Timing error correction estimates may push the sampling phase back or forward 216, depending on how the detector interprets the sample 210.

However, as the sampling phase moves away from its current sampling interval, it necessarily moves towards another. For example, if the phase drifts later in time, it will eventually move into the proximity of the expected sampling phase for the following symbol 214. Conversely, if the phase drifts earlier in time, it will eventually move into the proximity of the expected sample phase for the preceding symbol 212. As such, in the former case, the estimated data bit will begin to resemble one bit later in time, whereas in the latter case the estimated data bit will begin to resemble one bit earlier in time. As there may be no means to determine the correct integer alignment of the samples with the written or transmitted data sequence, the timing errors may act to lock the channel onto the closest symbol interval. These events, in which the timing loop locks onto an incorrect sampling interval, may be referred to as cycle slips, and can cause a discontinuity in the alignment of the samples to the data sequence.

As a simple example, assume that, due to a timing excursion, a sample 210 is taken in-between symbols 212 and 214, instead of at a peak of the symbols. The system may not know in which direction to correct the sampling phase (e.g. take the next sample early to push the phase backward, or take the next sample late to push it forward). Assume the correct response is to push the phase back (e.g. to the left), but instead the system adjusts the sampling phase forward (e.g. toward the right). After a period of time, the sampling phase may become fully locked one symbol ahead of where it should be, and therefore all subsequently received symbols may also be received out of order (e.g. one symbol early). As such the results would may be as follows: At the beginning of a sector (before the timing excursion) the alignment would be correct; however, at the end of the sector, the timing is off by 1 bit, with 1 bit being "lost" due to skipping ahead. Further, the sampled values while the adjustment was taking place may be of low quality and the corresponding bit values unclear. The received data may therefore not be recoverable through error correction or may otherwise not be able to be decoded. The effects of timing excursions are shown in regard to FIG. 3.

Figure 3:
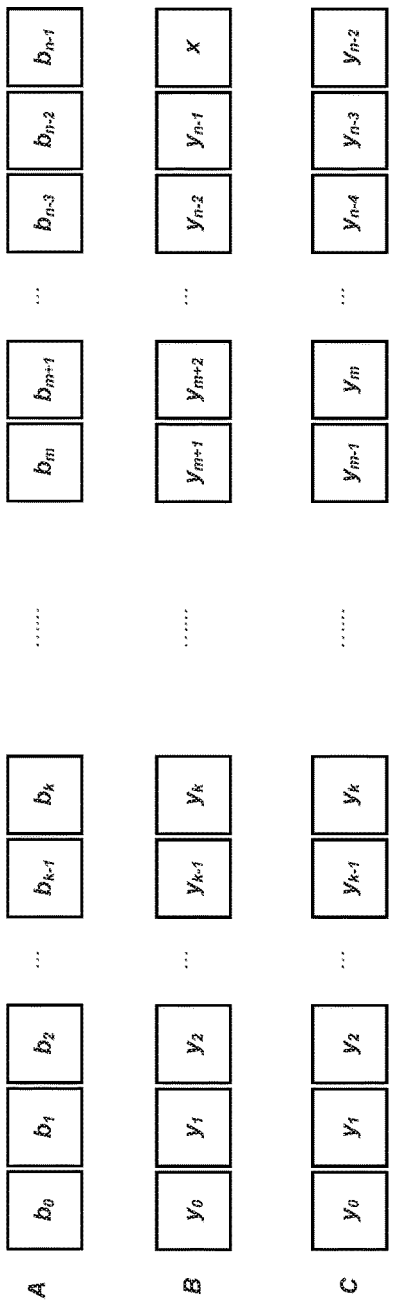
FIG. 3 is a diagram of timing excursion events, in accordance with certain embodiments of the present disclosure.

FIG. 3 is a block diagram 300 depicting effects of cycle slip events on a received bit sequence, in accordance with certain embodiments of the present disclosure. Diagram 300 depicts three data sequences, A, B, and C. Sequence A represents the alignment of a sequence of bits from the written or transmitted signal, having n consecutive bits, shown as $b_0$ through $b_{n-1}$. Sequence A may represent the "correct" sequence of bits unaffected by timing excursions. Sequences B and C correspond to sample sequences obtained from the data sequence A, during which timing excursions may produce incorrect bit sequences.

When sampling sequence A, a cycle slip may occur at some time between symbols k and m. As shown, the samples in sequences B and C are aligned with the underlying data sequence A up to bit k; however, they are shifted relative to the data sequence as of bit m.

Sequence B may have encountered a forward cycle slip, wherein the sample phase incorrectly locked onto a next symbol, resulting in a bit being "lost", or a next bit X after the sequence A being read into the sequence. Accordingly, while sequence A is at bit $b_m$, sequence B is at $y_{m+1}$, corresponding to symbol $b_{m+1}$. Sequence C may have encountered a backward cycle slip, wherein the sampling phase incorrectly locked onto a previous symbol, resulting in an extra bit being detected. Accordingly, while sequence A is at bit $b_{m+1}$, sequence C is still at $y_m$, corresponding to symbol $b_m$. As shown, both sequences B and C proceed to sample an incorrect symbol for all remaining bits. As these samples are typically applied to a detector and an error-correction code (ECC) decoder, such events are catastrophic to the recovery of the original data pattern from sequence A, and thus it is important to avoid such events.

Figure 4:
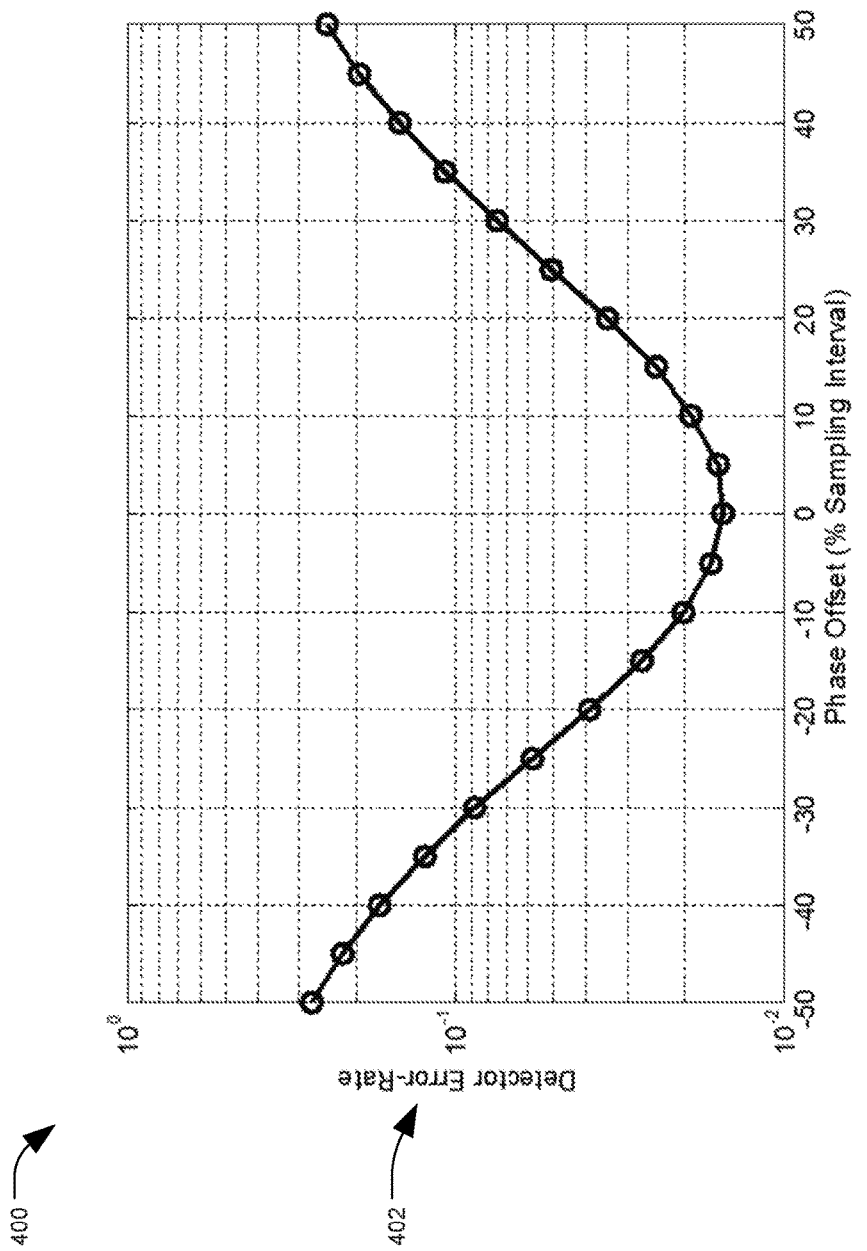
FIG. 4 is a graph of detector error rates in a system configured to perform timing excursion recovery, in accordance with certain embodiments of the present disclosure.

In sample data systems such as hard drives, a channel may perform an initial synchronization of a timing loop, which controls a sampling phase and sampling frequency, to the written data sequence (e.g. the sampling instances are set to be within an acceptable margin of error from the desired sampling instances). Once the timing loop is synchronized, operations proceed on the assumption that any deviations in the desired sampling instances are of sufficiently low bandwidth and magnitude such that the timing loop may remain locked once initialized (e.g. able to identify the correct symbol for each sample and adjust the timing error to adapt to deviations). Ultimately, the ability of a timing loop to maintain lock may be dependent on the performance of the utilized detector in the presence of phase offsets (if the detected data sequence is error-free, it is not possible to lose lock). FIG. 4 provides an example chart 400 of a detector error-rate 402 vs. the deviation of the sampling phase 404 from its expected value (expressed as a percentage of the sampling period). In some embodiments, a detector error-rate in excess of 1e-1 may be insufficient to maintain lock and, therefore, provided the instantaneous phase error is always in the range ~[−32%, +34%] of the expected sampling phase, the timing loop will be able to track the sampling phase back to its expected value (e.g. the timing loop will maintain lock). This range within which the timing loop is able to maintain lock may be referred to as the lock window.

In the context of magnetic recording, the above assumptions described in regard to FIG. 4 are valid in many cases. However, there are some exceptions. For example, Heat Assisted Magnetic Recording (HAMR) systems are able to achieve higher density recording than traditional magnetic hard drives through the use of high density, high coercivity, media. In HAMR systems, heat can be applied (e.g. using a laser) to the high coercivity media during the write process to momentarily reduce the media's coercivity such that the media may be magnetized to its desired polarity without the use of extremely strong magnetic fields. An issue that has been observed in HAMR is that, during a write, the phase of the written waveform may contain instantaneous discontinuities. Most discontinuities, referred to as mode hops, are relatively small in magnitude (e.g. less than 25% of a sampling interval) and, thus, may be tracked out by the timing loop. In some cases, however, the mode hops may be significantly larger in magnitude, approaching or even exceeding half of the sampling interval. Some timing loops will be unable to recover from such events and, thus, can lead to unrecoverable data sectors. Unexpectedly large discontinuities can also arise in systems other than HAMR devices. Additional timing excursion detection and correction systems can be applied to address the discrepancies and prevent data loss. A device configured to perform timing excursion recovery and incorporating the system of FIG. 1 is shown in FIG. 5.

Figure 5:
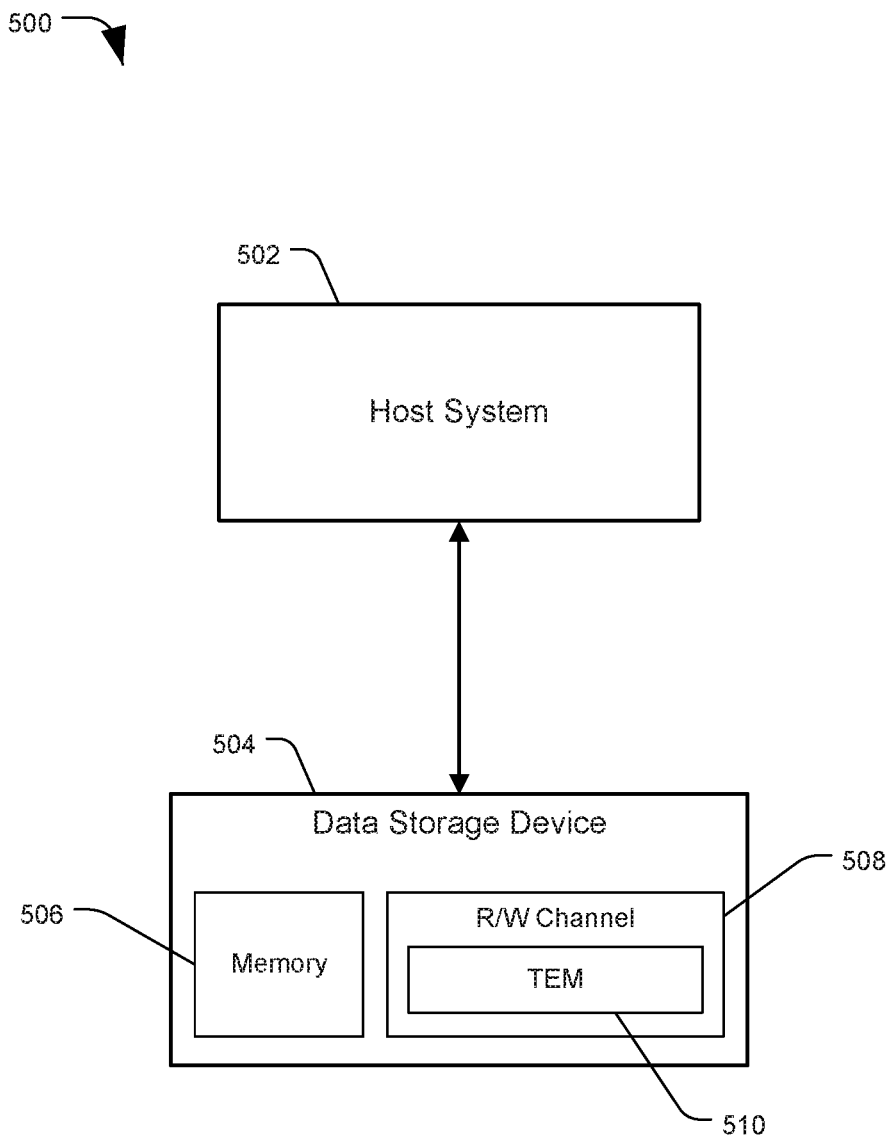
FIG. 5 is a diagram of a system configured to perform timing excursion recovery, in accordance with certain embodiments of the present disclosure.

FIG. 5 is a diagram of a system configured to perform timing excursion recovery, generally designated 500, in accordance with certain embodiments of the present disclosure. The system 500 may include a host 502 and a data storage device (DSD) 504. The host 502 may also be referred to as the host system or host computer. The host 502 can be a desktop computer, a laptop computer, a server, a tablet computer, a telephone, a music player, another electronic device, or any combination thereof. Similarly, the DSD 504 may be any of the above-listed devices, or any other device which may be used to store or retrieve data, such as a hard disc drive (HDD). The host 502 and DSD 504 may be connected by way of a wired or wireless connection, or by a local area network (LAN) or wide area network (WAN). In some embodiments, the DSD 504 can be a stand-alone device not connected to a host 502 (e.g. a removable data storage device having its own case or housing), or the host 502 and DSD 504 may both be part of a single unit (e.g. a computer having an internal hard drive).

The DSD 504 may include a memory 506 and a read/write (R/W) channel 508, such as the channel described in regard to FIG. 1. The memory 506 may comprise one or more data storage mediums, such as magnetic storage media like disc drives, other types of memory, or a combination thereof. The DSD 504 may receive a data access request, such as a read or write request, from the host device 502. In response, the DSD 504 may perform data access operations on the memory 506 via the R/W channel 508 based on the request. The R/W channel 508 may comprise one or more circuits or processors configured to process signals for recording to or reading from the memory 506.

Figure 6:
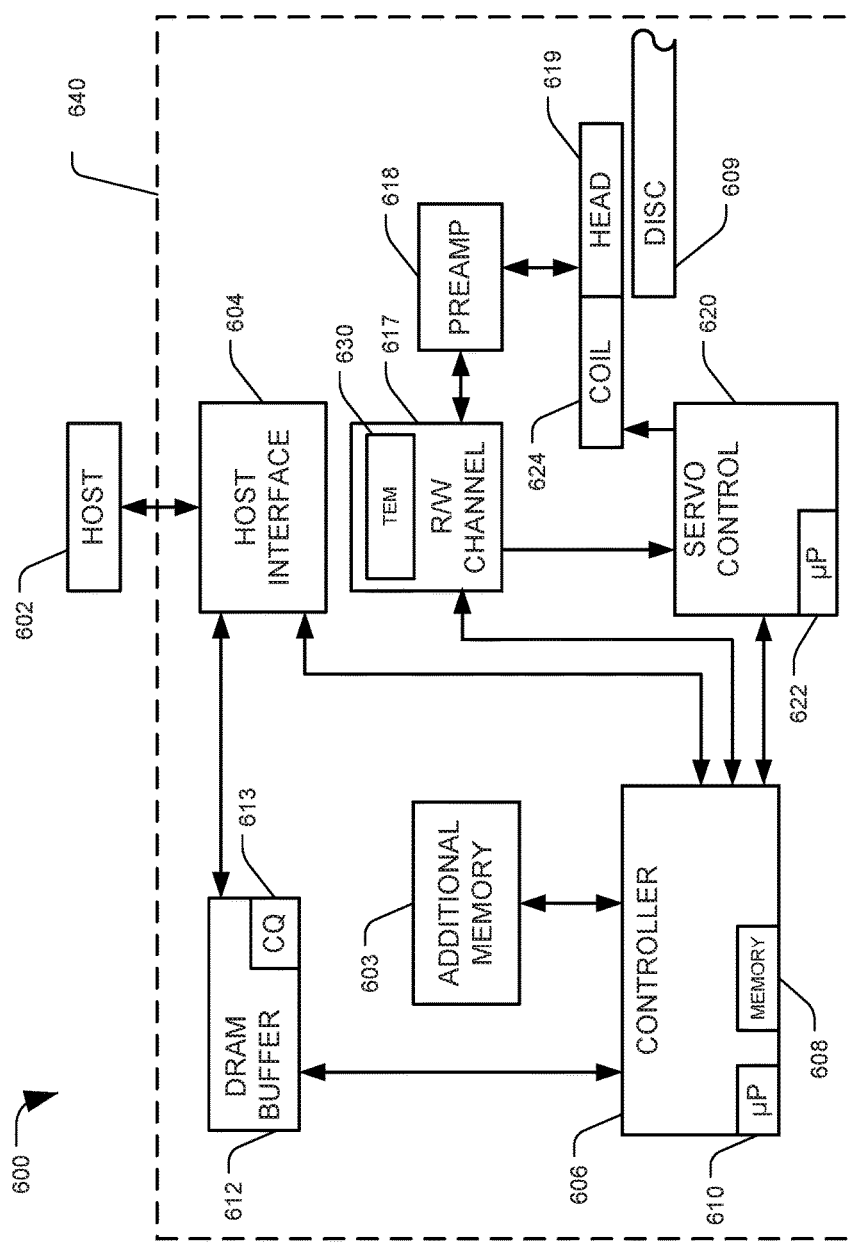
FIG. 6 is a diagram of a system configured to perform timing excursion recovery, in accordance with certain embodiments of the present disclosure.

DSD 504 may include a timing excursion module (TEM) 510, such as the TEM 116 of FIG. 1. The TEM 510 may perform the methods and processes described herein to detect and correct for timing excursions when sampling a signal, such as data recorded to memory 506. FIG. 6 provides a more detailed depiction of the system 500, according to certain embodiments.

FIG. 6 is a diagram of a system configured to perform timing excursion recovery, generally designated 600, in accordance with certain embodiments of the present disclosure. Specifically, FIG. 6 provides a functional block diagram of an example data storage device (DSD) 600. The DSD 600 can communicate with a host device 602 (such as the host system 502 shown in FIG. 5) via a hardware or firmware-based interface circuit 604. The interface 604 may comprise any interface that allows communication between a host 602 and a DSD 600, either wired or wireless, such as USB, IEEE 1394, Compact Flash, SATA, eSATA, PATA, SCSI, SAS, PCIe, Fibre Channel, Ethernet, or Thunderbolt, among others. The interface 604 may include a connector (not shown) that allows the DSD 600 to be physically removed from the host 602. The DSD 600 may have a casing 640 housing the components of the DSD 600, or the components of the DSD 600 may be attached to the housing, or a combination thereof. The DSD 600 may communicate with the host 602 through the interface 604 over wired or wireless communication.

The buffer 612 can temporarily store data during read and write operations, and can include a command queue (CQ) 613 where multiple pending operations can be temporarily stored pending execution. Commands arriving over the interface 604 may automatically be received in the CQ 613 or may be stored there by controller 606, interface 604, or another component.

The DSD 600 can include a programmable controller 606, which can include associated memory 608 and processor 610. The controller 606 may control data access operations, such as reads and writes, to one or more disc memories 609. The DSD 600 may include an additional memory 603 instead of or in addition to disc memory 609. For example, additional memory 603 can be a solid state memory, which can be either volatile memory such as DRAM or SRAM, or non-volatile memory, such as NAND Flash memory. The additional memory 603 can function as a cache and store recently or frequently read or written data, or data likely to be read soon. Additional memory 603 may also function as main storage instead of or in addition to disc(s) 609. A DSD 600 containing multiple types of nonvolatile storage mediums, such as a disc(s) 609 and Flash 603, may be referred to as a hybrid storage device.

The DSD 600 can include a read-write (R/W) channel 617, which can encode data during write operations and reconstruct user data retrieved from a memory, such as disc(s) 609, during read operations. A preamplifier circuit (preamp) 618 can apply write currents to the head(s) 619 and provides pre-amplification of read-back signals. In some embodiments, the preamp 618 and head(s) 619 may be considered part of the R/W channel 617. A servo control circuit 620 may use servo data to provide the appropriate current to the coil 624, sometimes called a voice coil motor (VCM), to position the head(s) 619 over a desired area of the disc(s) 609. The controller 606 can communicate with a processor 622 to move the head(s) 619 to the desired locations on the disc(s) 609 during execution of various pending commands in the command queue 613. The DSD 600 may have two distinct channels for processing data sectors and servo sectors (e.g. a data channel and a servo channel), although in some embodiments a single channel may be used for both types of signal processing, or certain components may be shared by both channels. For example, the preamp 618 and R/W channel 617 may include components used when processing servo data, and the servo control 620 may also include components of the servo channel and perform servo signal processing.

DSD 600 may include a timing excursion module (TEM) 330. The TEM 330 may perform the methods and processes described herein to detect and correct for timing excursions when sampling a signal, such as data recorded to disc 609. The TEM 330 may be a processor, controller, other circuit, or a portion thereof, it may include a set of software instructions that, when executed by a processing device, perform the functions of the TEM 330, or any combination thereof. The TEM 330 may be part of or executed by R/W channel 617, included in or performed by other components of the DSD 600, a stand-alone component, or any combination thereof. Additional details of an example channel, such as R/W channel 617 or the communication channel of FIG. 1, and related signal processing are discussed in regard to FIG. 7.

Figure 7:
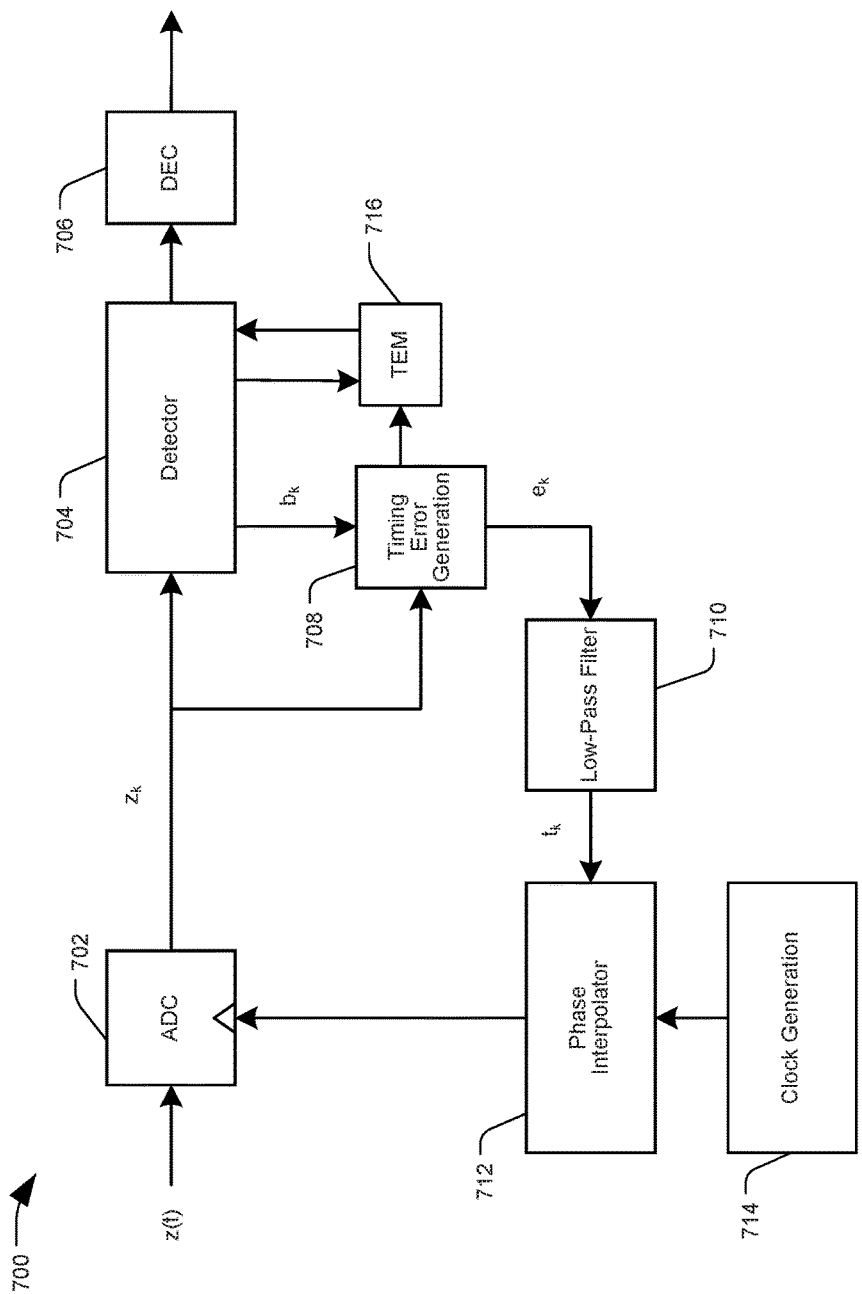
FIG. 7 is a diagram of a system configured to perform timing excursion recovery, in accordance with certain embodiments of the present disclosure.

FIG. 7 is a diagram of a system configured to perform timing excursion recovery, generally designated 700, in accordance with certain embodiments of the present disclosure. System 700 may correspond to certain embodiments of system 100 from FIG. 1. For example, the digital receiver 714 of FIG. 1 may include a detector 704, and a decoder 706. Timing recovery module 112 of FIG. 1 may include a timing error generation module 708, a low pass filter 710, and a phase interpolator 712. As shown, the conditioned signal z(t) is provided to the ADC 702. The ADC 702 may provide a sample sequence $z_k$ to the detector 704. The detector may provide estimates of the received data sequence ($b_k$) to the decoder 706, as well as to the timing error generation module 708. The timing error generation module 708, the low-pass filter 710, and the phase interpolator 712 may comprise a timing loop that adjusts the sampling phase in response to samples ($z_k$) and estimates of the data ($b_k$). The timing error generation module 708 may generate a timing error ($e_k$) based on the digitized samples and estimates of the written or transmitted data sequence ($b_k$). The timing errors may then be averaged at the low-pass filter 710 and applied as a control signal ($t_k$) to a phase interpolator 712, a module capable of synthesizing any phase of an applied clock signal as dictated by the control signal $t_k$. The clock signal applied to the phase interpolator 712 may be generated by a clock generation module 714. As such, the phase of the sampling clock supplied to the ADC 702 can be adjusted to drive the computed (filtered) timing error to zero.

One difficulty in realizing a timing error corrected system is that the estimates of the written or transmitted data sequence ($b_k$) must be of sufficient reliability to generate high-quality timing errors. As the detector 704 is also a sampled data system it, too, may depend on the applied samples $z_k$ to be generated at an expected sampling phase. When working properly, the sampling phase used by the ADC 702 should be at (or near) the expected sampling phase such that high-reliability estimates $b_k$ of the underlying data sequence can be made. Small perturbations about this phase may result in only a small degradation of the quality of the detector 704 decisions; however, they should remain of high enough reliability to generate quality error estimates $e_k$ to drive the sampling phase back to its expected value. This condition may be referred to as a "locked" condition, in that the sampling phase used by the ADC 702 is locked to the frequency of the signal.

Figure 8:
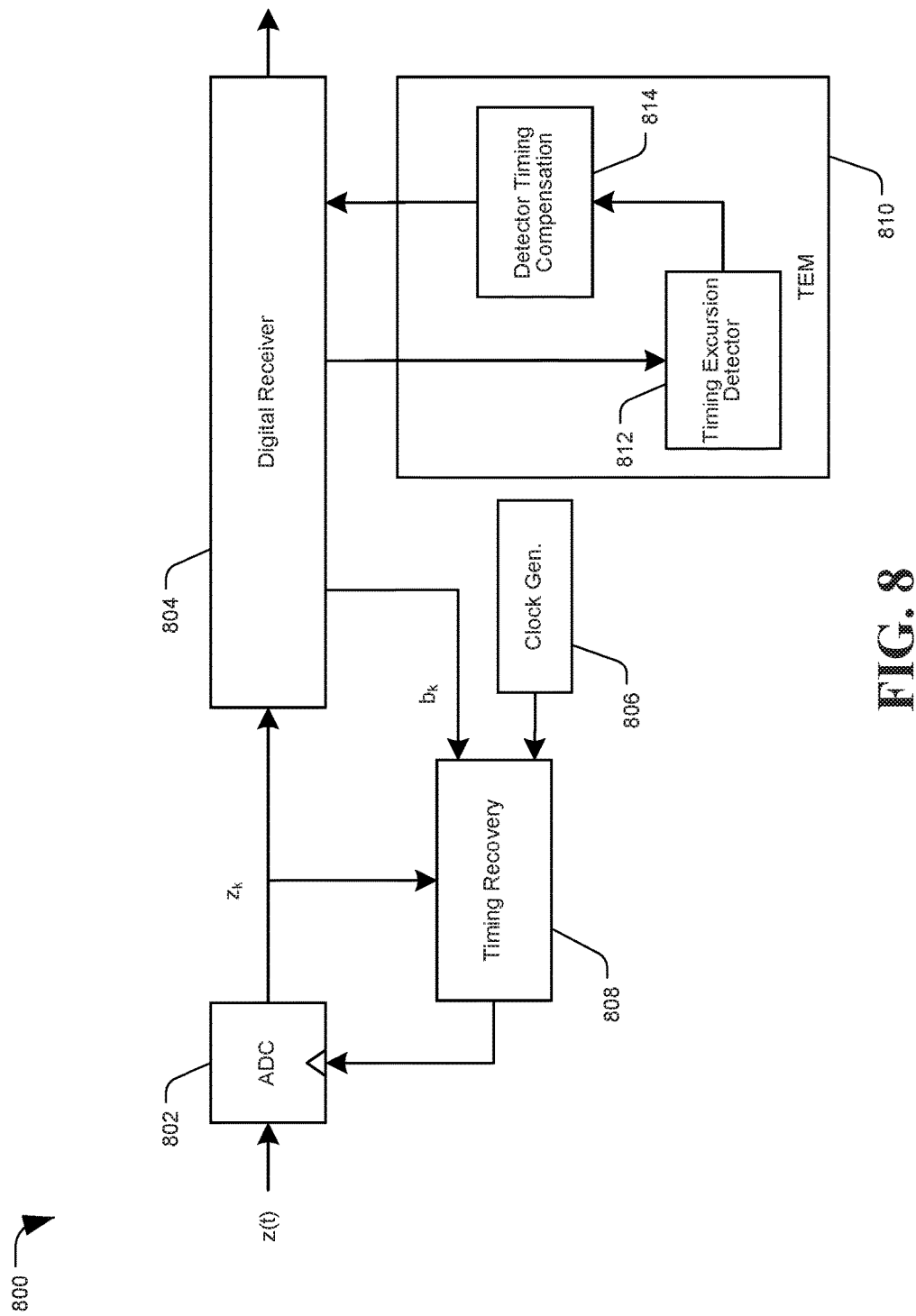
FIG. 8 is a diagram of a system configured to perform timing excursion recovery, in accordance with certain embodiments of the present disclosure.

If the sampling phase deviates too significantly from its expected value, the reliability of the detector 704 estimates can degrade significantly. In this case, the timing error quality may suffer and, in some instances, will be unable to drive the sampling phase back to its expected value. Here, low quality timing errors $e_k$ may cause the sampling phase to drift away from its intended value (e.g. be "corrected" in the wrong direction), until it "locks" onto the previous or next symbol instead of the correct one. This erroneous sampling phase correction can result in the data from the signal being unrecoverable. Accordingly, timing error estimates $e_k$ may also be provided to a timing excursion module (TEM) 716, which may detect timing excursions as described herein. Alternately, the TEM 716 may receive the sample values $z_k$ and the sample estimates $b_k$ and calculate its own $e_k$ in order to detect timing excursions, in which case the TEM 716 may replace or incorporate the timing error generation module 708. When timing excursions are detected, the TEM 716 may then provide input to the detector 704 as to what the expected sampling phase should be based on the assessment of the existence of a timing excursion. By adjusting the expected sampling phase of the detector 704 in this manner, the system may remain locked to the proper symbol rather than drifting to an incorrect symbol. FIG. 8 provides another example system configured to perform timing excursion recovery.

FIG. 8 is a diagram of a system configured to perform timing excursion recovery, generally designated 800, in accordance with certain embodiments of the present disclosure. System 800 may include a channel having an analog to digital converter (ADC) 802, a digital receiver 804, a clock signal generator 806, and a timing recovery module 808, similar to those described in regard to FIG. 1. System 800 may also include a timing excursion module (TEM) 810 to detect and correct for cycle slips or timing excursions.

The TEM 810 may include a timing excursion detector module 812 and a detector timing compensation module 814. During normal operation, the timing excursion detector 812 monitors the sampling phase to detect anomalies (e.g. timing excursions) occurring in the tracking process. The timing excursion detector may calculate timing or phase errors based on sample values $z_k$ and sample estimates $b_k$ from the receiver 804, or the timing excursion detector 812 may receive error estimates $e_k$ from a timing error generation module. The errors may be determined based on a difference between the sampled values and what expected values would be if obtained at the expected sampling phase. These error values may be accumulated to determine when large timing excursions are encountered. The timing excursion detector 812 may be configured to determine the polarity, relative magnitude and, in some implementations, the locations of timing excursion events. The polarity and magnitude of the timing excursion may indicate how the timing loop responded to the excursion. The timing excursion detector may generate output indicating whether a timing excursion was detected (e.g. a binary 'yes' or 'no' based on whether the errors exceeded a threshold value, or a 'certainty range' based on the magnitude of the errors), and the information such as polarity, magnitude, etc. The response of the timing loop may be correct or incorrect, and a determination may be made as to whether the data was successfully decoded before timing excursion correction or compensation is performed.

When a given read fails to decode, the output of the timing excursion detector 812 may be utilized to determine if, indeed, the failure was caused by a timing excursion event and, if it was, how the tracking loop responded to that event. When a re-read is performed on the failed sector, the detector timing compensation module 814 can utilize this information to shift the expected sampling phase of the detector in a manner that reduces the probability that a cycle slip will occur. For example, shifting the lock window of the timing loop by adjusting the expected sampling phase of the detector may allow the detector to correctly adjust for the phase offset of the timing excursion and correctly maintain lock.

Figure 9:
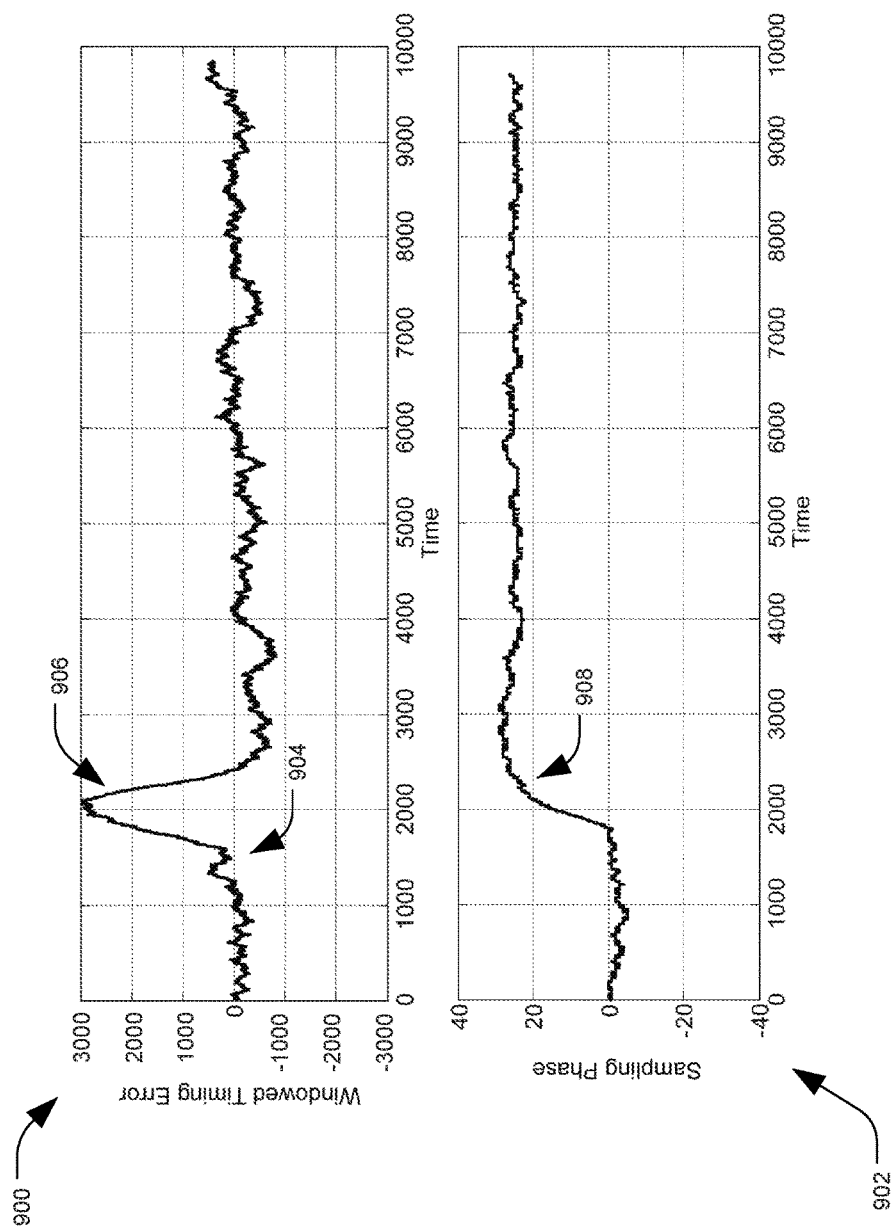
FIG. 9 is a graph of timing errors and sampling phase in a system configured to perform timing excursion recovery, in accordance with certain embodiments of the present disclosure.

Turning to FIG. 9, two graphs are depicted illustrating an example timing excursion error, in accordance with certain embodiments of the present disclosure. The top graph 900 depicts a windowed timing error over a time period (with the time represented as, e.g., samples obtained from a signal). As stated above, the timing error may be based on a deviation of the sampled values from expected values if a signal is sampled at an expected sampling phase, accumulated over time. There may be minor fluctuations in the timing error due to various factors (e.g. amplitude errors), but the timing error may generally remain near 0 outside of a significant timing excursion. Significant timing excursions may result in repeated and large deviations of the sampled values from the expected values, resulting in spikes in the timing error. A windowed timing error may refer to a sum of timing errors over a period of time. This can be in a number of different forms; for example, a moving average windowed timing error at time k may be the sum of timing errors from time k-N to time k (where N is the window length). In some embodiments, a "forgetting factor" or time-based weighting can be included into a windowed timing error. For example, the windowed timing error at time k could be a sum of timing errors at times (k–1), (k–2), (k–3), etc., which are weighted by (1, ½, ⅓, etc. . . . ). In this way, the timing errors further into the past give less contribution to the sum.

The bottom graph 902 depicts an adjusted sampling phase over a time period (samples) driven by a timing loop based on the timing error. Large timing excursions may result in the timing loop pushing the sampling phase 902 quickly in a direction to compensate for the excursion. The direction of sampling phase compensation may be incorrect, which can result in a cycle skip.

As stated above, the timing excursion detector may be a module configured to detect anomalies in the sampling phase during the read of a sector. In particular, if a timing excursion occurs, the timing excursion detector may discern any or all of the polarity, magnitude, and location of the timing excursion. When a negative timing excursion occurs, at approximately position 904 and time 1500, the resulting timing error 906 may be positive. This timing error 906 may be accumulated through the low-pass filter and, as a result, the sampling phase 902 may be ramped in the positive direction 908 to rectify the observed offset. As the sampling phase 902 is adjusted and approaches the expected sampling phase the timing error 906 returns back to near zero and the sampling phase 902 settles at its correct value. Conversely, in the case of a positive polarity timing excursion, the timing error may be negative and the sampling phase may be adjusted in the negative direction.

The timing excursion detector may be configured to detect the existence of a timing excursion, and discern its associated attributes, by utilizing either a slope of the sampling phase 902 or a magnitude of the windowed timing error 906. These signals are, in fact, interchangeable (since the sampling phase 902 is obtained by integrating the timing error 906) and, therefore, reference may be made to only the windowed timing error 906 for the remaining disclosure without restricting the covered embodiments to only using this implementation.

The detection of the existence, polarity, and location of any excursion(s) occurring during the read of a sector may be conducted to detect a single event per sector (or other segment of the signal), or to detect multiple events per sector. As described above, the data used to detect the events may be provided to the timing excursion detector by a digital receiver of a data channel.

When detecting a single event per sector, the timing excursion detector may, for each sector, save only the minimum and maximum values of the windowed timing error 900 (or, equivalently, the slope of the sampling phase 902) as well as the location of one or both of these observed values. For the example provided in FIG. 9, the windowed timing error 900 may give values of [min,max,loc]=~[−800, 3000, 2100]. The min and max values may be the actual (instantaneous) minimum and maximum values observed over a sector. The loc value may be the location or time when the largest absolute value between the min and the max occurred. In FIG. 9, the max value may be approximately 3000, which occurs at approximately location (time) 2100, and the min value may be approximately negative 800 (−800), which occurs at approximately time 3700. Because the absolute value of the max is larger than the absolute value of the min, only the location of the max needs to be stored, as that may indicate the magnitude and direction of the timing excursion. In some embodiments, the max and min, and the location (time) of each can be stored. This functionality may be implemented in hardware with very low complexity. The min, max, and location values may be stored to a register for retrieval if the signal fails to decode, in order to perform timing excursion compensation. The min or max values may be compared against a threshold to determine whether the detected anomaly is large enough to likely correspond to a timing excursion.

When detecting multiple events per sector, the timing excursion detector may establish the start and end of each event in order to distinguish distinct events. A magnitude and polarity of the event may also be recorded. To establish the start and end points of each event, a threshold may be utilized to which the magnitude of the windowed timing error 700 is compared to determine periods of timing excursions. Distinct thresholds may be utilized for positive and negative excursions. An excursion may, then, be defined as a period of time over which the observed magnitude of the windowed timing error 900 exceeds the specified threshold. For example, a threshold of 2000 may be utilized in FIG. 9, which would result in an excursion being detected for the period of time ~[1800, 2200]. As it may take time for the windowed timing error to increase in magnitude such that it exceeds the specified threshold, the actual excursion may be determined to have occurred a period of time before time 1800. The correct location of the timing excursion may, however, be accurately estimated from the utilized timing loop bandwidth. Since each excursion may now be assigned a start point and an end point, an arbitrary number of potential events may be stored for each sector. This can greatly improve the capability of the channel to recover data from sectors including multiple discontinuities. It may also be useful to store the maximum and minimum windowed timing error associated with each event that is detected for later use in correcting for detected discontinuities.

The timing excursion detector may detect only what action was taken by the timing loop, but may provide no indication as to whether that action was correct. For example, if a cycle slip occurs, the timing excursion detector may detect the presence of an anomaly, and the direction of the timing loop's sampling phase corrective reaction; however, this direction would have been incorrect, resulting in the cycle slip. As such, the utility of the timing excursion detector may be in its use in error recovery. In the event of a decoder failure, the output of the timing excursion detector may be checked to determine if the failure was, indeed, caused by a timing excursion. If deemed so, a determination may be made that the action taken by the timing loop was incorrect and, thus, the appropriate action may be taken on a subsequent re-read. This compensation procedure is discussed further below.

Figure 10:
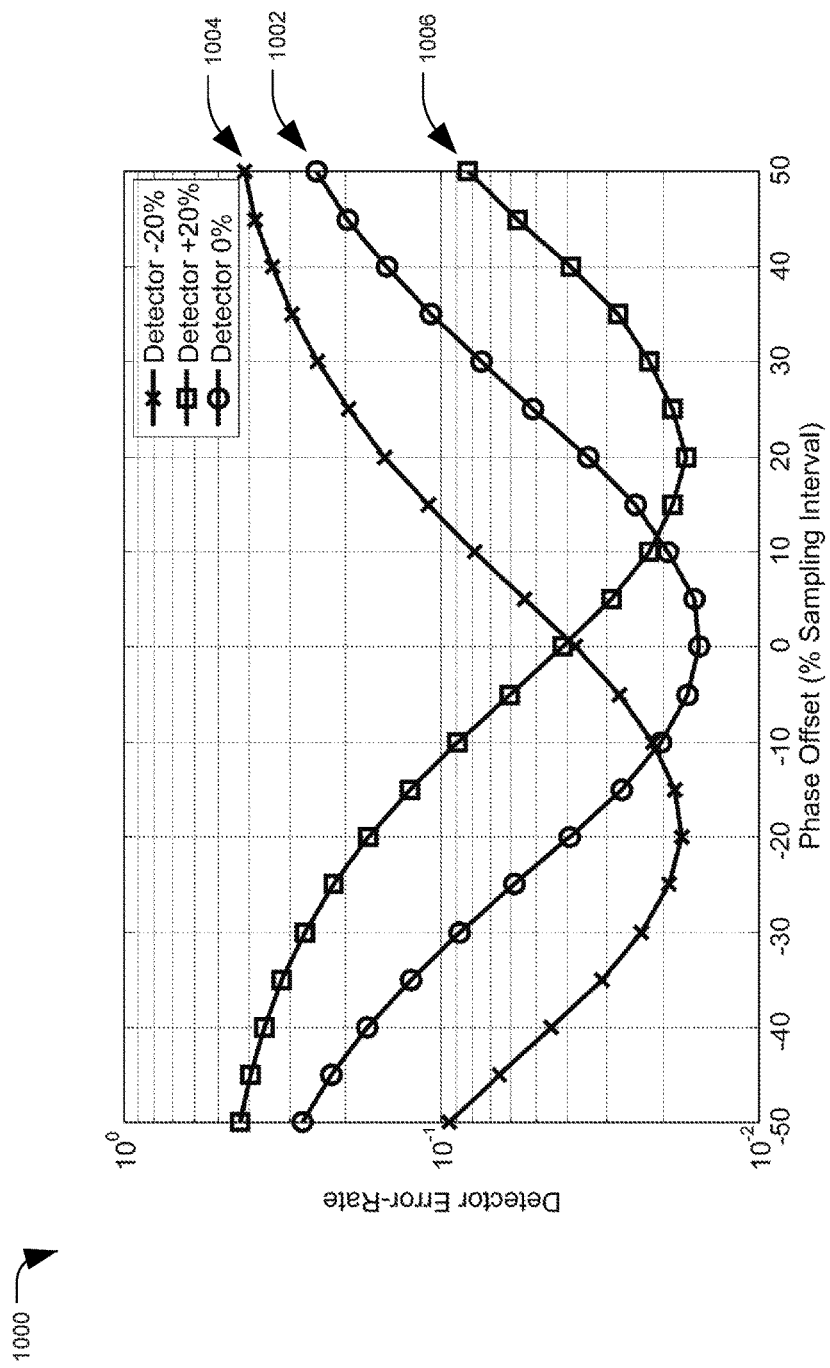
FIG. 10 is a graph of detector error rates in a system configured to perform timing excursion recovery, in accordance with certain embodiments of the present disclosure.

As discussed and illustrated in FIG. 4, the performance of a detector implemented for a sampled data system may degrade the more significantly the sampling phase deviates from its expected value. That being said, the choice of expected sampling phase may be somewhat arbitrary with respect to the resulting detector performance. Strictly speaking, if the signal has energy at frequencies greater than half the sampling rate, sampling the signal may result in aliasing. In this case, sampling phase does matter due to the inherent folding of the signal energy; however, this effect can be small, and will not be addressed here. The relation between a detector error-rate and a phase offset from an expected sampling phase is depicted in FIG. 10. FIG. 10 depicts an example chart 1000 showing the detector error-rate vs. phase offset for three different detectors which are designed at sampling phases 0% (line 1002), −20% (line 1004), and +20% (line 1006) of the sampling interval, respectively. The 0% sampling phase may correspond to whatever is selected as the expected sampling phase, with phase offsets (−20%, etc.) relative to the expected sampling phase. As shown, each detector achieves its optimal error-rate at its respective expected sampling phase, and all three detectors are able to achieve almost identical optimal error-rates. However, the lock window within which each detector may maintain lock on the signal is different. If the lock window includes error rates below $10^{-1}$, then the lock window for line 1002 may be from ~−32% to +35%, the lock window for line 1004 may be from ~−50% to +15%, and the lock window for line 1006 may be from ~−12% to +50%. The different lock windows may be better suited to maintaining lock on timing excursions of different polarities.

The detector timing compensation performed by the detector timing compensation module 814 of FIG. 8 may benefit from the ability to switch or adjust the expected sampling phase of the utilized detector based on the magnitude, polarity, location, or a combination thereof, of a timing excursion. Expected sampling phase adjustment can be achieved through a number of implementations, such as detector timebase shifting, pre-optimized detectors, and sampling interpolation.

In the detector timebase shifting implementation, the utilized detector may be modified, or the parameters of the detector changed, to adjust the expected sampling phase of the detector. This may be accomplished for target-based detectors, for example, by interpolating the target polynomial to achieve the desired shift. When a sector fails to decode, a detector timing compensation module can evaluate the output of a timing excursion detector to determine whether a timing excursion event occurred during a sector, and if so, how the timing loop responded to the timing excursion. The detector timing compensation module could then adjust the expected sampling phase of the detector in the correct direction for a re-read attempt so as to shift the lock window and improve the detector's ability to correctly respond to the timing excursion. For example, the detector timing compensation module may adjust the expected sampling phase in an opposite polarity to how the timing loop responded on the first read attempt, on the assumption that the sector failed because the timing loop responded incorrectly to the timing excursion. The detector parameters may be calculated and adjusted on-the-fly. For example, the detector timing compensation module may determine the appropriate phase shift amount, and then interpolate parameters to the appropriate values. Detector parameters may be calculated and loaded into registers for signal processing.

For the pre-optimized detectors implementation, multiple detectors may be designed at different sampling phases a-priori, such that they may be retrieved and used on demand. The multiple detectors may be accomplished by including multiple different detector components in the channel, each configured for one or more different sampling phases. The system may switch between the different detectors in order to best interpret sampled signals. The multiple detectors may also be accomplished via pre-configured parameter sets stored to memory that can be loaded onto a signal detector as needed. This may only require the storage of the detector's parameters to be switched in when desired. For example, an expected sampling phase of the detector may be modified by updating a register to direct the detector to access a look-up table having different coefficients to generate an interpolation filter corresponding to the desired sampling phase.

For the sampling interpolation implementation, rather than shifting the expected sampling phase of the detector, the samples can be interpolated to achieve the negative of the desired phase shift. For example, rather than using a detector optimized at +20%, the samples may be interpolated by −20% of the sampling interval. An interpolation filter could be applied at the detector or another component to shift the phase of the samples as desired. Interpolating the samples may allow the detector to provide optimum performance without adjusting the detector's expected sampling phase parameters. The sampling interpolation implementation may be amenable to an arbitrary selection of phase offset, as only the selected interpolation coefficients may require adjustment to achieve any desired offset. The detector timing compensation module may be configured to perform the sample interpolation and provide the interpolated samples to the detector, or the detector timing compensation module may direct another component to perform the interpolation.

The detector timing compensation performed by the detector timing compensation module may be performed in a number of ways. For example, two methods may include static detector timing compensation, and dynamic detector timing compensation.

Static detector timing compensation may lend itself to a low-complexity implementation. With static compensation, a single detector with a selected expected sampling phase may be utilized for the entirety of a re-read operation. In the event of a sector failure which is deemed by the timing excursion detector to be caused by a timing excursion, the detector expected sampling phase for the re-read may be modified according to the polarity of the detected excursion (and, possibly, its magnitude). For example, if the polarity of the excursion is positive, the expected sampling phase may be adjusted to +20%, thus adjusting the "lock range," or range of sampling phases which will not induce a cycle slip, to ~[−20%, +60%] of the sampling interval. Adjusting the expected sampling phase by 20% may increase the lock range by approximately 20% to the positive side.

In some embodiments, the detector timing compensation module may not adjust the detector phase by an arbitrary amount. The detector may also need to maintain lock during the read up to the point of the timing excursion, as well as after the timing excursion is resolved, so the range of the detector must include the phase 0 in its lock range. Adjusting the phase too much in the positive or negative direction may prevent the detector from correctly interpreting samples from the sector outside of the excursion.

The static detector timing compensation method may be most useful if there is a single significant timing excursion in the sector, or if there are multiple timing excursions of the same polarity. By shifting the lock range of the detector relative to the original range, the detector may be less robust to phase excursions of the opposite polarity. For example, using a detector configured to expect a sampling phase +20% may allow for excursions up to +60% to be recovered from; however, negative excursions with magnitude in excess of −20% may cause cycle slips.

Relatedly, the method of "detection of a single event per sector" discussed above may be well suited for use in static detector timing compensation. Since the maximum positive and maximum negative windowed timing errors may be stored, those values can be used to determine the appropriate shift in the detector's expected sampling phase, which may allow recovery without being vulnerable to all phase excursions of the opposite polarity. The magnitude and polarity of the phase shift may be selected to ensure that both the maximum negative and positive values are within the recoverable range. The maximum positive and negative values can be used to select a sampling phase that allows the detector to capture both extremes, when possible.

Static detector timing compensation could also be used without the inclusion of a timing excursion detector. In such an embodiment, it can be assumed that a sector failure is caused by a timing excursion since there is no detector to attest to the cause of failure. Since the polarity of the assumed excursion may be unknown, both polarities may be tried during subsequent re-reads of the sector. Different detector sampling phase shifts may also be applied. The lack of a timing excursion detector may come at the expense of an elongated recovery time.

In order to recover from multiple phase excursions of potentially different polarities, static detector timing compensation as described above may not be effective. Instead of or in addition to the static detector timing compensation method, more complex methods may also be used that offer some advantages over the static method. These more complex methods may include dynamic detector timing compensation.

Dynamic detector timing compensation may be based on the detection of multiple events per sector approach to excursion detection discussed previously. In this approach, the output of the timing excursion detector module may indicate, for each detected timing excursion, a starting and ending time, as well as a magnitude and polarity. During a re-read, the appropriate detector may be utilized based on the current location in a sector and the detected phase excursions (e.g. their locations, polarity, and magnitudes). In the dynamic compensation method, a 0% expected sampling phase detector can be utilized for all portions of the sector outside of the detected excursions. The significant advantage of dynamic detector timing compensation, as compared to static detector timing compensation, is that it may be used to resolve multiple timing excursions, of arbitrary polarities, within a single sector.

Furthermore, since the dynamic method is not restricted to utilizing parameters which will work for all portions of the sector, phase excursions of any magnitude may be compensated for. For example, using static detector timing compensation, phase excursions with magnitude in excess of, e.g. 75% of the sampling interval may not be recovered from, since the expected sampling phase of this detector may not be shifted such that both 75% and 0%, or −75% and 0%, are inside the detector's lock range. Using dynamic detector compensation, however, an excursion of arbitrary magnitude may be compensated for. For example, if an excursion of magnitude +80% occurs, detector parameters for phase +50% may be switched in at the time of the excursion. The adjust parameters should allow for initial pull-in from this excursion. As the timing loop reacts and begins to resolve the excursion, the detector parameters may be switched down to, e.g. +20%. Finally, when the excursion is completely resolved, detector parameters for 0% may be utilized.

As detailed in the example above, by "walking" the detector parameters appropriately (e.g. choosing the appropriate detector parameters and timing their use correctly), the phase may always be returned to its correct value. The timing excursion detector may be used to aid in this dynamic parameter switching in a real-time manner. Here, the windowed timing error may be monitored and, based on the current value of its magnitude and polarity, the parameters may be appropriate switched at the correct times. The timing excursion information collected during the first read (e.g. start, end, magnitude, polarity) may be to set the parameters of the detector for a re-read. During the re-read, the timing excursion module (TEM) may continue to monitor the timing error values. So, for example, when the first excursion is encountered during the re-read, the detector parameters can be changed accordingly. The expected phase may then be walked back towards the correct sampling phase (e.g. 0%). As the phase moves, timing error will begin to build since the current phase is moving away from the expected sampling phase of the modified detector. The timing error values monitored during the re-read can be used to time the next parameter switch (e.g. when the timing error values exceed a threshold).

Example methods for timing excursion detection and recovery are discussed in regard to FIGS. 11 through 14. The methods of FIGS. 11 through 14 may be performed by a timing excursion module (TEM) and other channel components as described herein.

Figure 11:
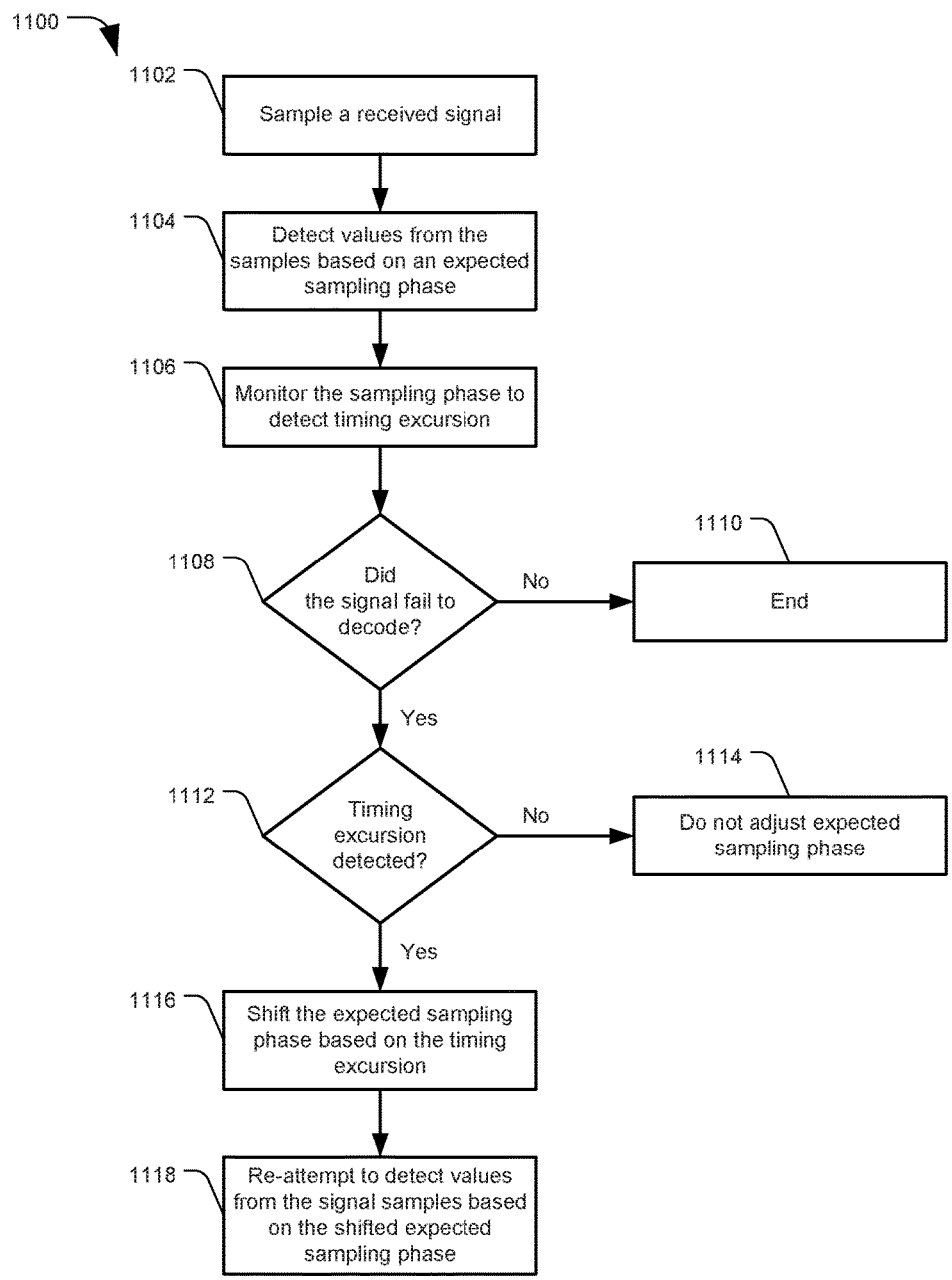
FIG. 11 is a flowchart of a method of timing excursion recovery, in accordance with certain embodiments of the present disclosure.

FIG. 11 is a flowchart of an example method 1100 of timing excursion recovery, in accordance with certain embodiments of the present disclosure. The method 1100 may include sampling a received signal (e.g. at an ADC) at a first sampling phase, at 1102. The method 1100 may include detecting values from the samples (e.g. at a detector) based on an expected sampling phase, at 1104. A timing excursion detector may monitor the sampling phase to detect a timing excursion, at 1106. For example, the timing excursion detector may monitor timing error values and store indicators when the timing error values exceed a threshold, minimum and maximum timing error values, locations at which timing errors peaked or exceeded thresholds, or other indicators of timing excursions.

At 1108, a determination may be made whether the signal failed to decode. For example, a decoder may be unable to decode the bit values generated by a detector, indicating poor bit error rate (BER). If the signal did not fail to decode, a determination may be made that the sector was successfully read, and the method 1100 may end at 1110.

If the sector did fail to decode, a determination may be made whether a timing excursion was detected while processing the sector, at 1112. For example, a timing excursion may be determined to have occurred if the timing errors exceeded a threshold value at 1106. If no timing excursion was detected, a determination may be made not to adjust the sampling phase on re-read attempts, at 1114.

If a timing excursion was detected, the method 1100 may include shifting the expected sampling phase of the detector based on the timing excursion, at 1116. For example, a timing compensation detection module may shift the expected sampling phase based on a magnitude, polarity, and location of the detected timing excursion(s). At 1118, the method 1100 may include re-attempting to detect values from the signal samples based on the shifted expected sampling phase, for example by performing a re-read operation.

Figure 12:
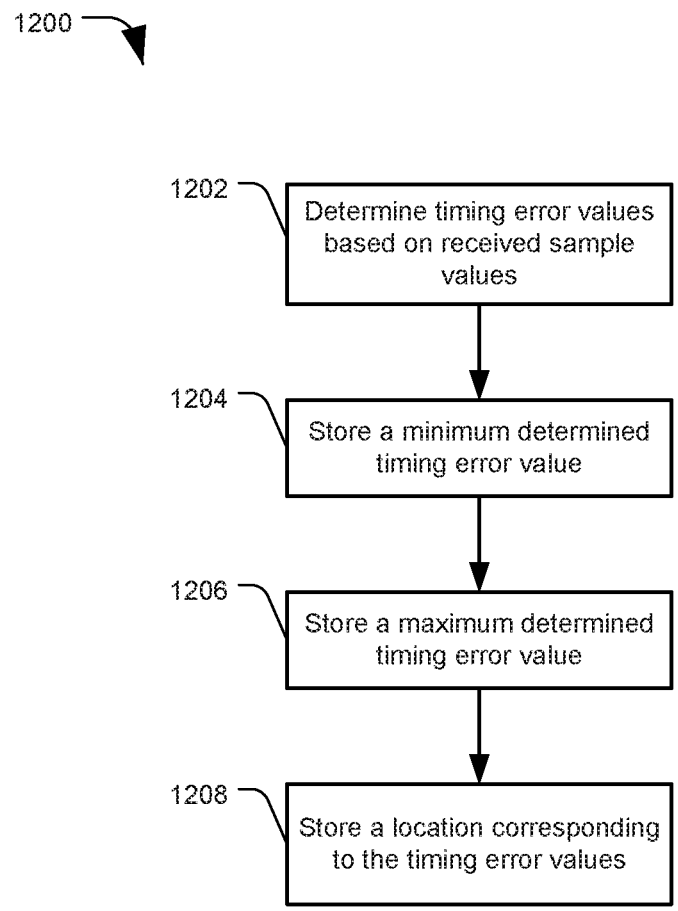
FIG. 12 is a flowchart of a method of timing excursion recovery, in accordance with certain embodiments of the present disclosure.

Various alterations to the method may be made. For example, a system may not include a timing excursion detector module, and so no detection of timing excursions may be performed at 1106, and no special determination regarding timing excursions may be made at 1112. Instead, the existence of a timing excursion may be assumed FIG. 12 is a flowchart of an example method 1200 of timing excursion recovery, in accordance with certain embodiments of the present disclosure. The method 1200 may include a method to detect a single timing excursion event per sector. At 1202, the method 1200 may include determining timing error values based on received sample values. For example, a timing excursion detector can determine timing error values based on the output of a channel detector.

The method 1200 may include storing a minimum determined timing error value observed over a segment of the signal (e.g. a sector of a storage medium), at 1204, and a maximum timing error value, at 1206. At 1208, the method 1200 may include storing a location corresponding to the stored timing error values, at 1208. The location may correspond to a time indicator or a sample number within the segment of the signal. A location value may be stored for the timing error value with the largest magnitude (e.g. based on the absolute values of the minimum and maximum timing error values), a point at which the timing error value first exceeded a threshold, a location for both the minimum and maximum values, or another location indicators for a timing excursion. The minimum, maximum, and location values may be stored to a register or other memory for use in adjusting an expected sampling phase if the read signal fails to decode.

Figure 13:
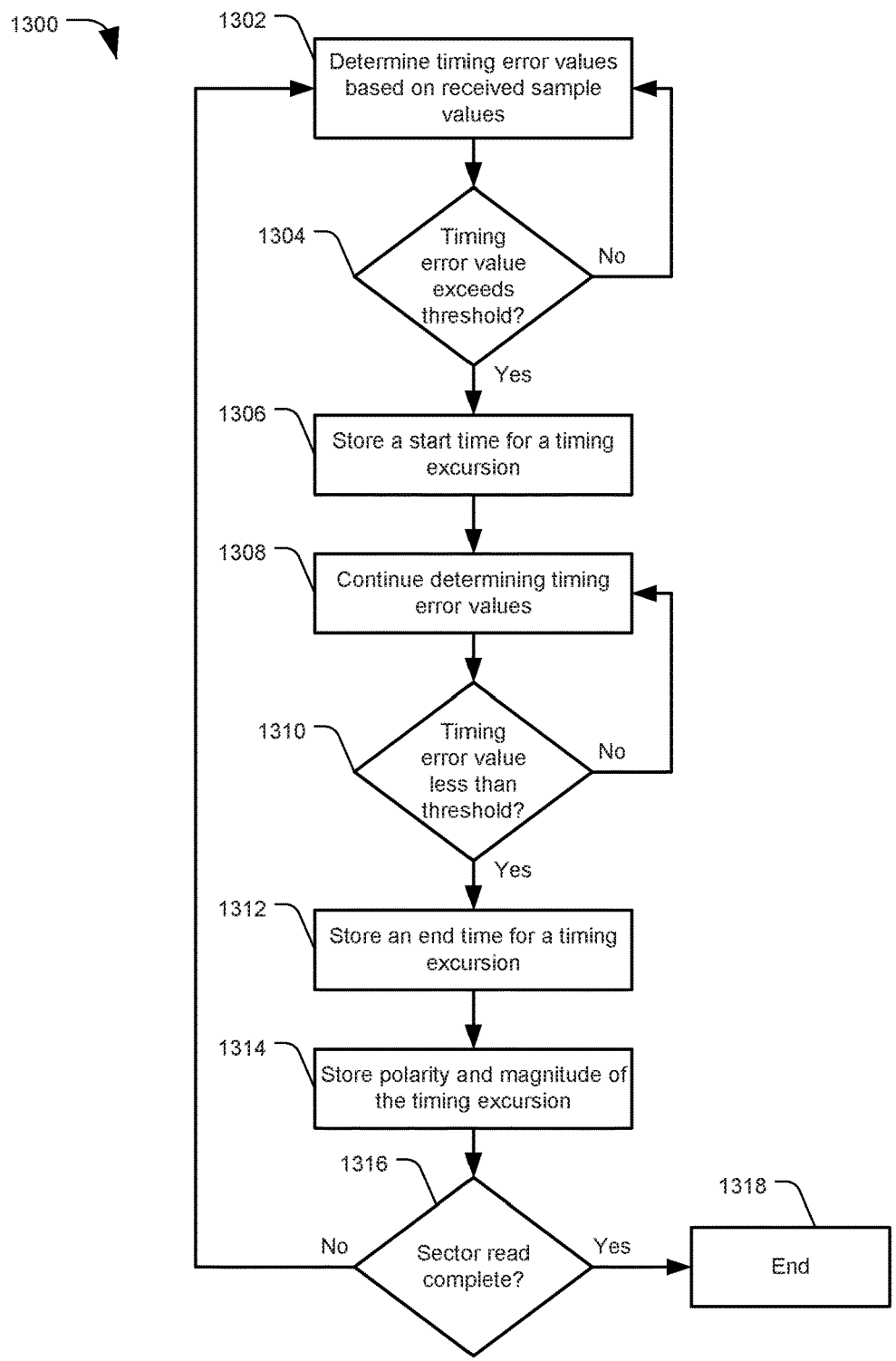
FIG. 13 is a flowchart of a method of timing excursion recovery, in accordance with certain embodiments of the present disclosure.

FIG. 13 is a flowchart of an example method 1300 of timing excursion recovery, in accordance with certain embodiments of the present disclosure. The method 1300 may include a method which can detect multiple timing excursion events per sector.

The method 1300 may include determining a sequence of timing error values based on received sample values, at 1302. A determination may be made whether a current timing error value exceeds a threshold value, at 1304. The threshold value may be set so that only large timing excursion events exceed the threshold. If the threshold is not exceeded, the method 1300 may include continuing to determine timing error values, at 1302.

If a timing error value does exceed the threshold, the method 1304 may include storing a start time or start location for a timing excursion, at 1306. For example, a timing excursion detector may store a time value or sample number corresponding to a point at which the timing error exceeded the threshold value. The method 1300 may include continuing to determine timing error values, at 1308, and determining whether a current timing error value is less than the threshold value, at 1310. If not, the method 1300 may include continuing to determining timing error values, at 1308. If the timing error value is less than the threshold, the method 1300 may include storing an end time for the timing excursion, at 1312. The timing excursion may correspond to the period over which the timing errors exceeded the threshold value. In some embodiments, the method 1300 may include storing a polarity (e.g. positive or negative) and magnitude (e.g. the largest timing error value during the timing excursion) of the timing excursion, at 1314. The start time, end time, and polarity and magnitude may be stored as a timing excursion indicator.

The method 1300 may include determining whether the sector read operation has completed, at 1316. If it has not, the method 1300 may include continuing to determine timing error values, at 1302, and potentially recording timing excursion indicators for additional timing excursions. If the sector read operation has completed, the method may end, at 1318.

Figure 14:
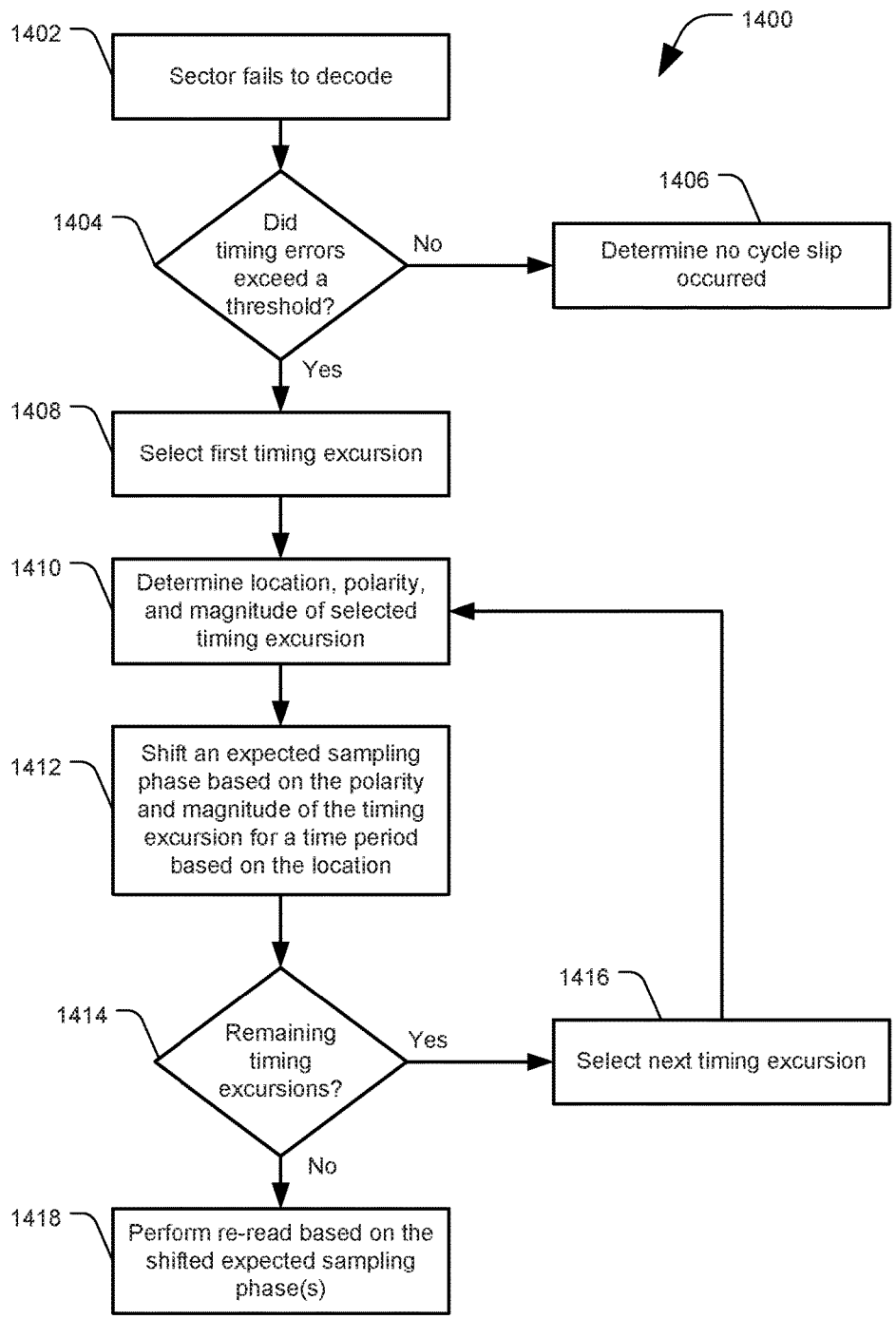
FIG. 14 is a flowchart of a method of timing excursion recovery, in accordance with certain embodiments of the present disclosure.

FIG. 14 is a flowchart of an example method 1400 of timing excursion recovery, in accordance with certain embodiments of the present disclosure. The method 1400 may include a method to adjust an expected sampling phase based on encountering a timing excursion.

The method 1400 may include a sector failing to decode, at 1402. A determination may be made whether sampling phase timing errors arising from the sector exceeded a threshold, at 1404. A timing excursion detector may be configured to detect anomalies in the sampling phase, allowing the identification of one or more timing excursions. Timing errors exceeding the threshold value may indicate a timing excursion occurred. If no timing errors exceeded the threshold, a determination may be made that no cycle clip occurred, and no modification to the expected sampling phase may be made, at 1406.

If timing errors did exceed a threshold, the method 1400 may include selecting a first timing excursion identified for the sector, at 1408. The method 1400 may include determining at least some of a location, polarity, and magnitude of the selected timing excursion, at 1410. For example, in a system configured to adjust for a single timing excursion per sector, the adjustment may be applied for the entire sector and a specific location for the timing excursion may not be needed.

The method 1400 may include shifting an expected sampling phase of a detector based on the polarity and magnitude of the timing excursion, and for a time period based on the location of the timing excursion. For example, in response to a timing excursion, the expected sampling phase can be adjusted by different polarities, magnitudes, or both, with the adjustment localized based on when the timing excursion was detected. Sampling phase adjustment localized based on timing excursions can be performed for a single excursion in a sector, or for multiple timing excursions within the sector. Shifting the expected sampling phase may adjust a lock range within which the detector can maintain a timing lock on the signal, and shifting the expected sampling phase for each timing excursion may enable the detector to maintain lock for timing excursions having opposite polarities that would otherwise exceed a lock range of the detector.

At 1414, a determination may be made whether there are any remaining timing excursions. If there are, the method 1400 may include selecting a next timing excursion that was identified within the sector, at 1416, and determining the excursion parameters at 1410. If no timing excursions remain, at 1414, a re-read attempt may be performed on the sector, employing the one or more shifted expected sampling phase(s) at the corresponding time periods, at 1418.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Moreover, although specific embodiments have been illustrated and described herein, it should be appreciated that any subsequent arrangement designed to achieve the same or similar purpose may be substituted for the specific embodiments shown.

This disclosure is intended to cover any and all subsequent adaptations or variations of various embodiments. Combinations of the above embodiments, and other embodiments not specifically described herein, will be apparent to those of skill in the art upon reviewing the description. Additionally, the illustrations are merely representational and may not be drawn to scale. Certain proportions within the illustrations may be exaggerated, while other proportions may be reduced. Accordingly, the disclosure and the figures are to be regarded as illustrative and not restrictive.

What is claimed is:

1. An apparatus comprising:
   a circuit configured to:
   detect a cycle slip event during processing of a signal at a data channel; and
   shift an expected sampling phase of a detector of the data channel for a subsequent attempt to process the signal, the expected sampling phase corresponding to an expected point at which the signal is sampled within a sampling interval for each symbol of the signal.

2. The apparatus of claim 1 further comprising:
   the circuit further configured to detect the cycle slip event based on a timing error produced from sampling the signal at a first sampling phase.

3. The apparatus of claim 2 further comprising:
   the circuit is configured to detect the cycle slip event by performing a process including:
   storing minimum and maximum timing error values for a segment of the signal; and
   determining whether either of the minimum and maximum timing error values exceed a threshold when the segment of the signal fails to decode.

4. The apparatus of claim 3 comprising the circuit further configured to:
   shift the expected sampling phase in a direction and magnitude determined based on a polarity and magnitude of the cycle slip event indicated by the minimum and maximum timing error values.

5. The apparatus of claim 2 further comprising:
   detecting the cycle slip event includes:
   storing an indicator of a timing excursion between the first sampling phase and an expected sampling phase, the indicator including:
   a start time when the timing error exceeded a threshold value;
   an end time when the timing error fell below the threshold value; and
   determining a cycle slip event occurred when the signal fails to decode and there was at least one timing excursion.

6. The apparatus of claim 5 further comprising:
   the circuit is configured to shift the expected sampling phase by performing a process including:
   shifting the expected sampling phase for each timing excursion in a direction based on a polarity of a corresponding timing excursion; and
   shifting the expected sampling phase for a time period based on the start time and the end time of the corresponding timing excursion.

7. The apparatus of claim 6 further comprising:
   shifting the expected sampling phase adjusts a lock range within which the detector maintains a timing lock on the signal; and
   shifting the expected sampling phase for each timing excursion enables the detector to maintain lock for timing excursions having opposite polarities that would otherwise exceed the lock range of the detector.

8. The apparatus of claim 1 further comprising:
   detecting the cycle slip event includes determining the cycle slip event occurred when the signal fails to decode;
   shifting the expected sampling phase includes:
   shifting the expected sample phase in a first direction on a first re-attempt to process the signal; and
   shifting the expected sample phase in a second direction opposite to the first direction on a second re-attempt to process the signal.

9. The apparatus of claim 1 further comprising:
   the data channel is configured to decode a data signal read from a magnetic data storage medium having data stored in sectors; and
   the circuit is configured to shift the expected sampling phase on a re-read attempt when a sector fails to decode on an initial read attempt.

10. The apparatus of claim 1 further comprising:
    the circuit configured to shift the expected sampling phase by interpolating sample values obtained from the signal to achieve a negative of a desired phase shift.

11. The apparatus of claim 1 further comprising:
    the circuit configured to shift the expected sampling phase by retrieving a selected detector designed at a desired sampling phase from a plurality of detectors designed at different sampling phases.

12. The apparatus of claim 1 further comprising:
    the circuit configured to shift the expected sampling phase by computing new parameters of the detector based on a desired shift in sampling phase.

13. A method comprising:
    detecting a cycle slip event during processing of a signal at a data channel based on timing error values produced from sampling the signal at a first sampling phase; and
    shifting an expected sampling phase of a detector of the data channel for a subsequent attempt to process the signal, the expected sampling phase corresponding to an expected point at which the signal is sampled within a sampling interval for each symbol of the signal.

14. The method of claim 13 further comprising:
    detecting the cycle slip event includes:
    storing a magnitude and polarity of timing error values; and
    determining a cycle slip occurred when the timing error values exceed a threshold and the signal fails to decode.

15. The method of claim 14 further comprising shifting the expected sampling phase in a direction and amount determined based on the polarity and magnitude of the timing error values.

16. The method of claim 14 further comprising:
    detecting the cycle slip event includes:
    storing indicators of one or more timing excursions between the first sampling phase and an expected sampling phase, each indicator including:

a start time when the timing error values exceeded a threshold value;

an end time when the timing error values fell below the threshold value;

determining a cycle slip occurred when the signal fails to decode and there was at least one timing excursion;

shifting the expected sampling phase includes:

shifting the expected sampling phase for each timing excursion in a direction based on a polarity of a corresponding timing excursion; and shifting the expected sampling phase for a time period based on the start time and the end time of the corresponding timing excursion.

17. An apparatus comprising:

a data channel configured to:

determine sample values from a signal received at the data channel;

determine timing error values based on a comparison between a sampling phase at which the signal is sampled and an expected sampling phase of a detector of the data channel, the expected sampling phase corresponding to an expected point at which a signal is sampled within a sampling interval for each symbol of the signal;

detect a timing excursion in the signal based on the timing error values;

in response to the signal failing to decode, adjust the expected sampling phase of the detector during a re-read attempt to process the signal based on the timing excursion.

18. The apparatus of claim 17 further comprising:

the data channel includes:

the detector, configured to adjust the sampling phase in a first direction via a timing loop based on a difference between the sampling phase and the expected sampling phase on a first read attempt; and a timing excursion compensation module configured to adjust the expected sampling phase of the detector on the re-read attempt, causing the detector to adjust the sampling phase in a second direction opposite to the first direction.

19. The apparatus of claim 18 comprising the data channel further configured to:

detect a first timing excursion having a first polarity while reading a sector;

detect a second timing excursion having a second polarity opposite to the first polarity while reading the sector;

during the re-read attempt on the sector:

adjust the expected sampling phase in the first direction to shift a lock window, within which the data channel can maintain phase lock on the signal, to maintain lock during the first timing excursion; and adjust the expected sampling phase in a second direction opposite the first direction to shift the lock window to maintain lock during the second timing excursion.

20. The apparatus of claim 18 comprising the data channel further configured to:

determine timing error values based on the difference between the sampling phase and the expected sampling phase;

detect the timing excursion based on timing errors exceeding a threshold;

store magnitude and polarity data corresponding to the timing excursion; and adjust the expected sampling phase based on the magnitude and polarity data.

* * * * *